United States Patent
Avrahami et al.

(10) Patent No.: US 10,264,331 B2
(45) Date of Patent: Apr. 16, 2019

(54) METHOD DEVICE ASSEMBLY AND SYSTEM FOR FACILITATING THE INTERCONNECTION OF COMMUNICATION BEARING CABLES

(75) Inventors: Zohar Avrahami, Petach-Tikva (IL); Joseph Arol, Kiryat-Ono (IL)

(73) Assignee: XENOPTICS IP HOLDINGS PTY LTD., Clayton South, Victoria (AU)

( * ) Notice: Subject to any disclaimer, the term of this patent is extended or adjusted under 35 U.S.C. 154(b) by 1031 days.

(21) Appl. No.: 13/517,062

(22) PCT Filed: Jul. 29, 2010

(86) PCT No.: PCT/IB2010/053456
§ 371 (c)(1),
(2), (4) Date: Jun. 19, 2012

(87) PCT Pub. No.: WO2011/013090
PCT Pub. Date: Feb. 3, 2011

(65) Prior Publication Data
US 2012/0275743 A1    Nov. 1, 2012

(51) Int. Cl.
*G02B 6/35* (2006.01)
*H04Q 1/06* (2006.01)

(52) U.S. Cl.
CPC ............ *H04Q 1/06* (2013.01); *G02B 6/3564* (2013.01)

(58) Field of Classification Search
None
See application file for complete search history.

(56) References Cited

U.S. PATENT DOCUMENTS

| | | | | |
|---|---|---|---|---|
| 5,613,021 | A * | 3/1997 | Saito et al. | 385/17 |
| 7,525,968 | B1 | 4/2009 | Dropps et al. | |
| 7,702,193 | B2 * | 4/2010 | Arol et al. | 385/17 |
| 2002/0159729 | A1 | 10/2002 | DiMascio et al. | |
| 2006/0029321 | A1 | 2/2006 | Ikarashi et al. | |
| 2006/0062575 | A1 | 3/2006 | Zami et al. | |

FOREIGN PATENT DOCUMENTS

| | | |
|---|---|---|
| WO | 2000243432 | 5/2002 |
| WO | 2006054279 | 5/2006 |
| WO | 2006054300 | 5/2006 |

OTHER PUBLICATIONS

Search Report dated Jun. 16, 2011 for International Application No. PCT/IB2010/053456.

* cited by examiner

*Primary Examiner* — Jerry Rahll
(74) *Attorney, Agent, or Firm* — A.C. Entis-IP Ltd.; Allan C. Entis

(57) ABSTRACT

Disclosed is a method device assembly and system for facilitating the interconnection of communication bearing cables connected cable connectors. An interconnect-point support structure comprising two or more cable connector slots, wherein in each of the two or more slots is adapted to host a cable connector attached to a respective cable. A mechanical arm functionally associated with the interconnect-point support structure is adapted to release a cable connector, mobilize and mate it to another connector.

27 Claims, 30 Drawing Sheets

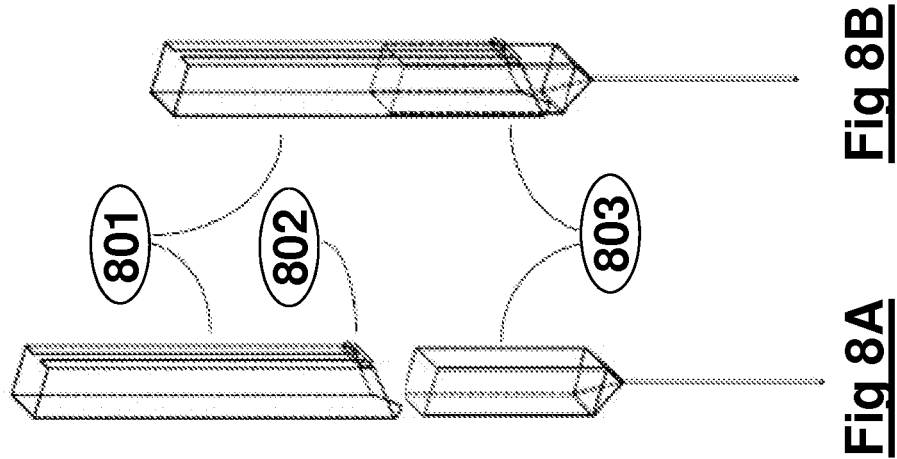

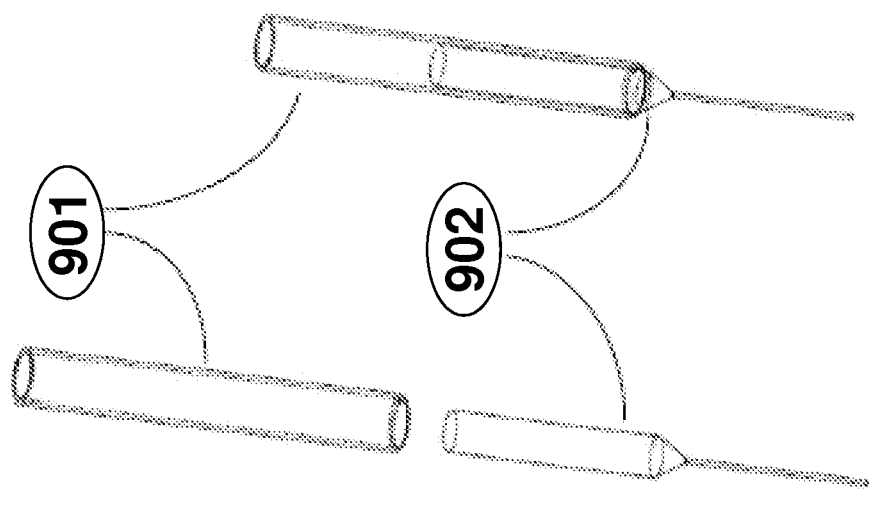

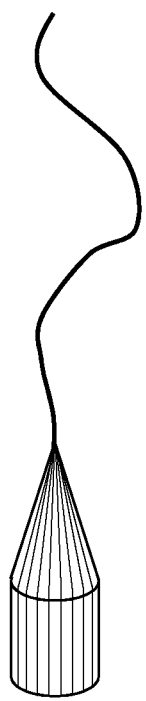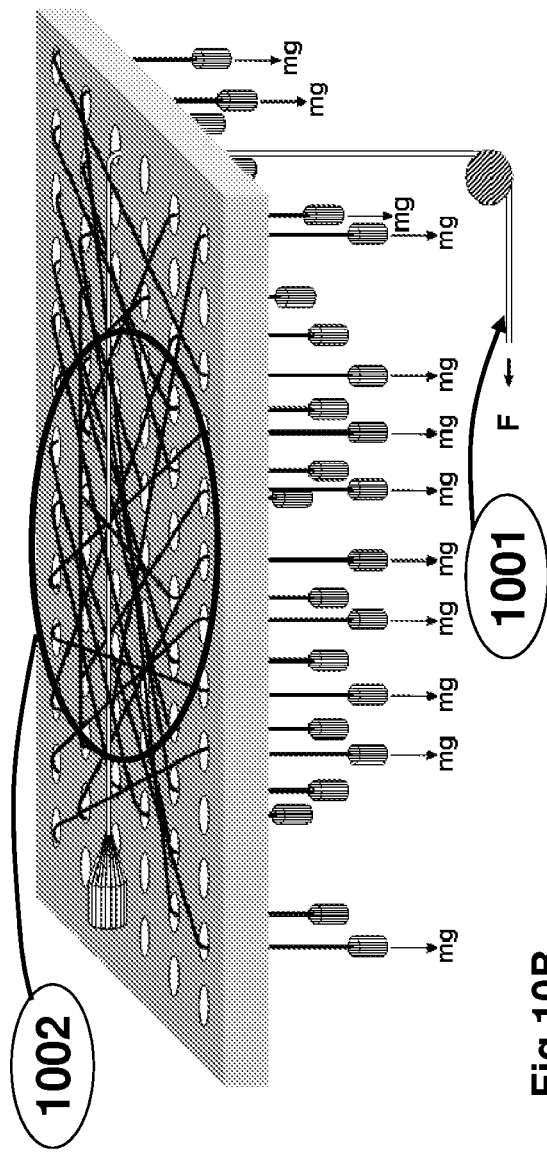
Fig 10A
Fig 10B

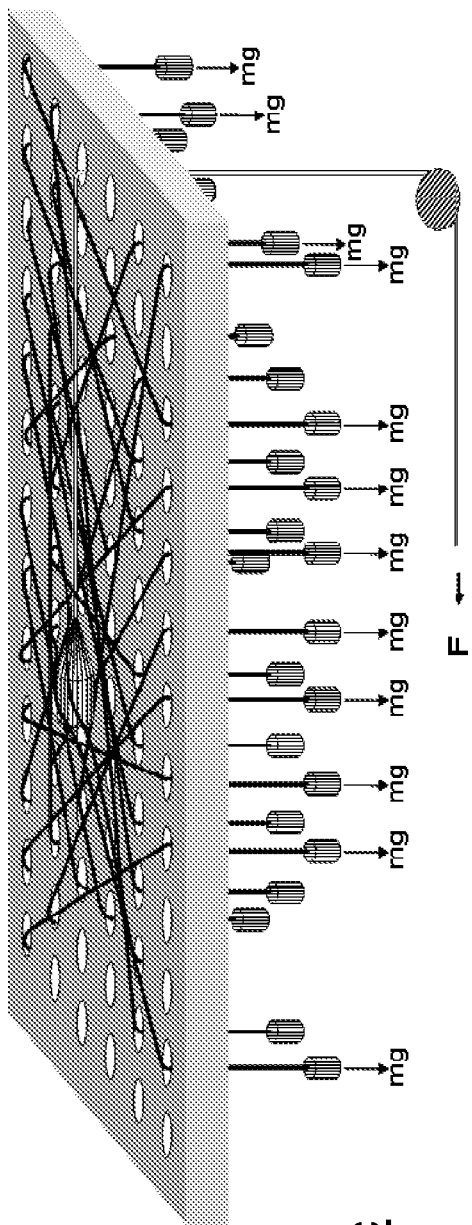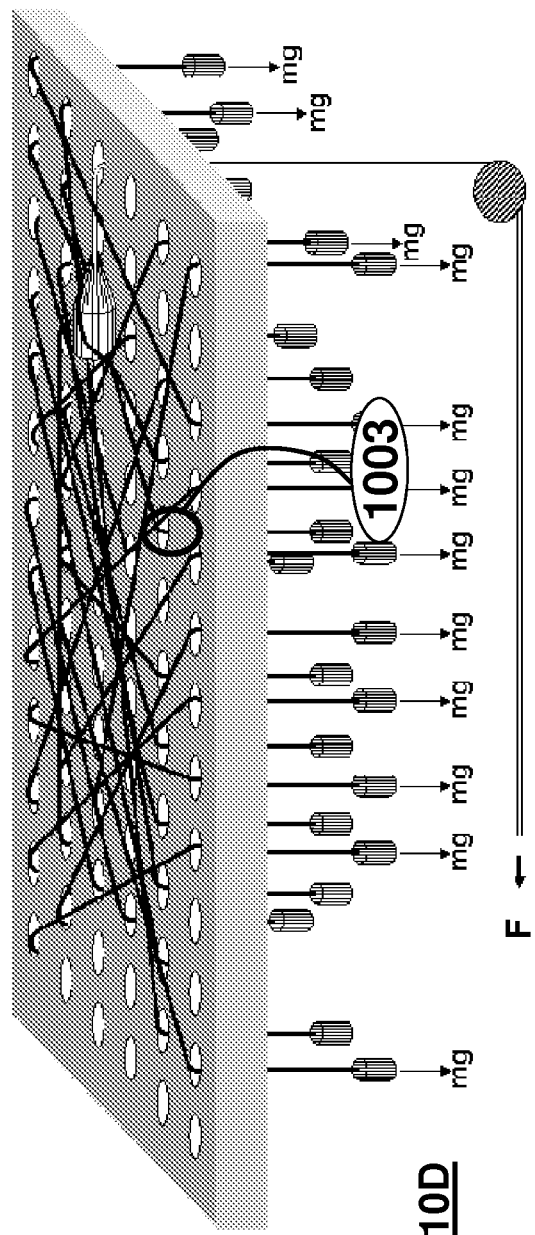
Fig 10C
Fig 10D

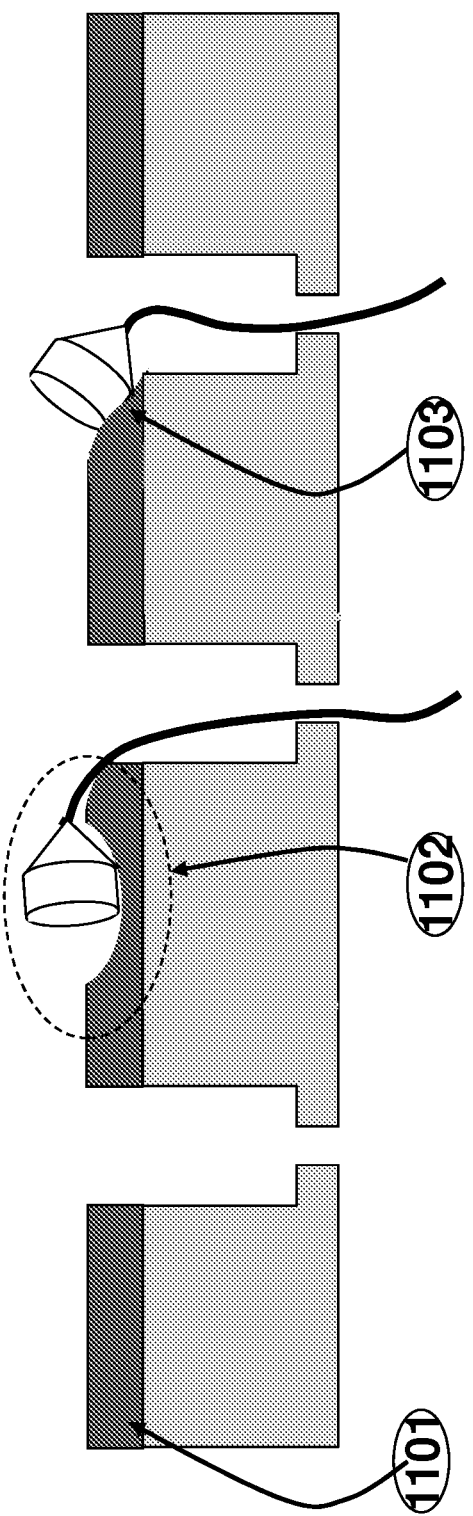

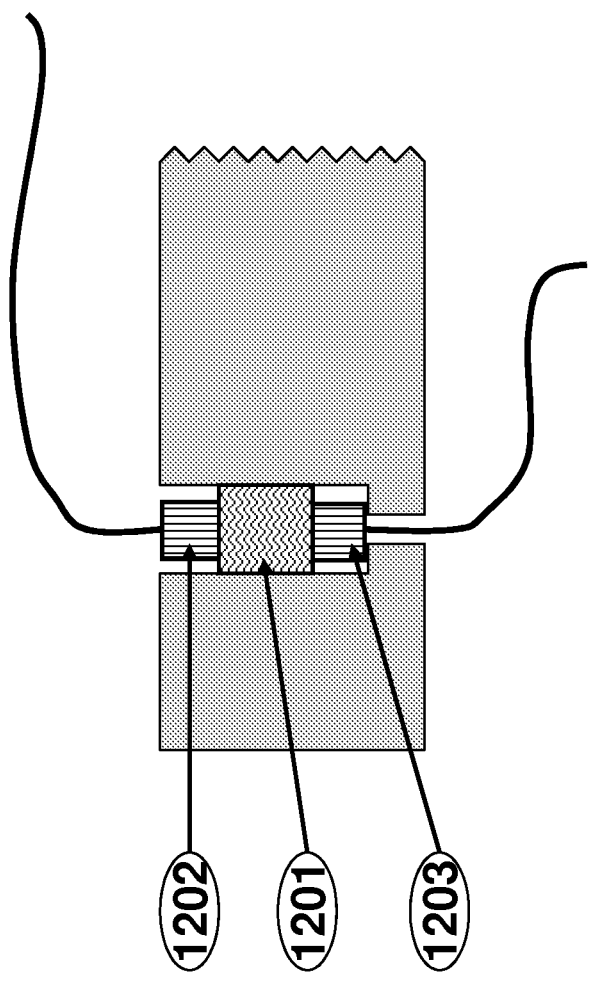

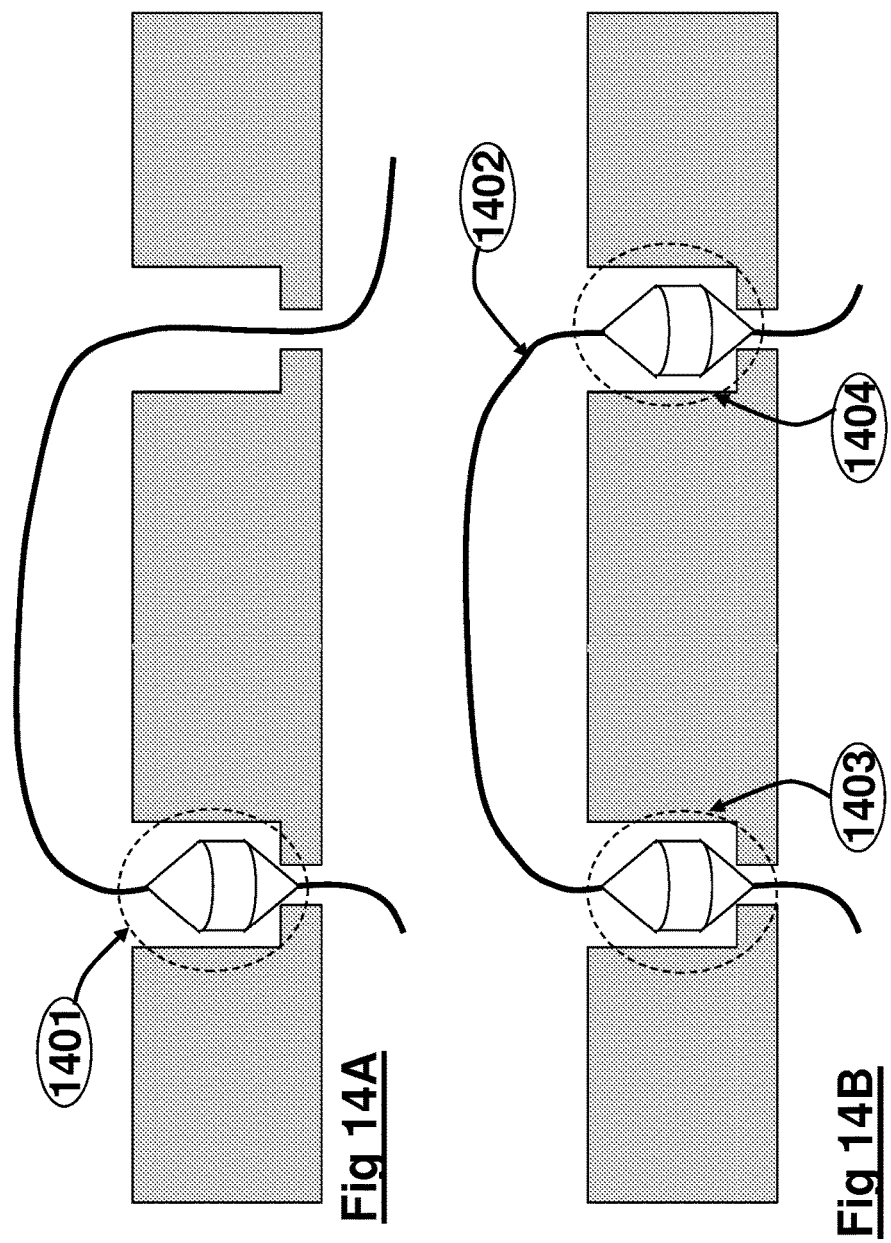

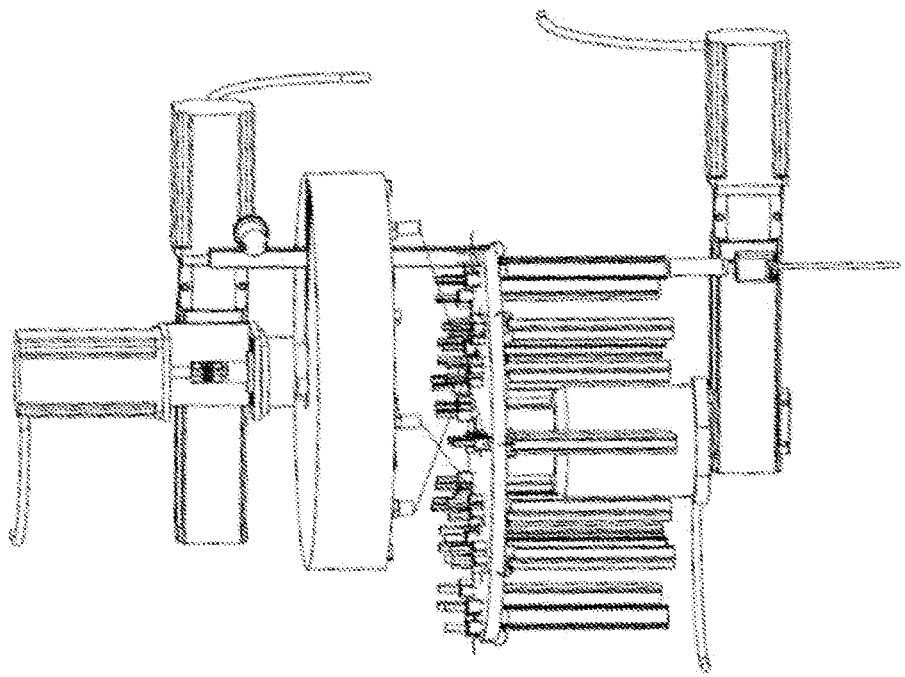
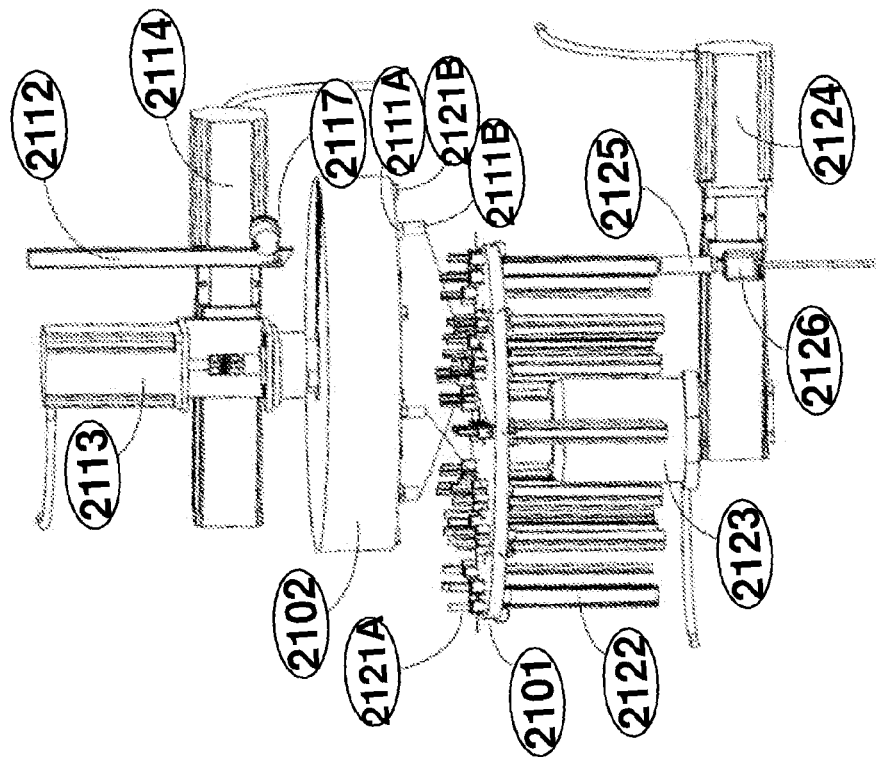
Fig 21A
Fig 21B

METHOD DEVICE ASSEMBLY AND SYSTEM FOR FACILITATING THE INTERCONNECTION OF COMMUNICATION BEARING CABLES

FIELD OF THE INVENTION

The present invention generally relates to the field of cable interconnection. More specifically, the present invention relates to a method, device, assembly and system for facilitating the interconnection of communication bearing cables.

BACKGROUND

A cross-connect device is a switch that receives plurality of conductors and operates to connect pairs of said conductors in order to configure desired physical paths throughout the said plurality of conductors. Said conductors may be fiber optic wires, electrical wires or coax wires. The most common cross-connect device is the ordinary Distribution Frame also known as patch panel, ODF, FDF and MDF, wherein plurality of conductors are terminated by connectors mounted on a panel where cross connections between pairs are performed manually by patch conductors.

There have been attempts to develop cross connect optical devices based on beam deflection in free space fabrics which naturally allow crossing of light beams However, those free space devices are inadequate in terms of: cost, insertion loss, passiveness, non-blocking (as they can only connect between members of input group to output group) and high port count. Due to their inherent drawbacks those devices are not suitable for network physical configuration management.

Another approach attempted is by utilizing robotic mechanism to create connections. In this approach a robotic mechanism is adapted to perform by imitating the manual operation of an ordinary patch panel. However, due to the impossibility to control and predict the topology of the crossing patches and to avoid the "patches spaghetti effect" which eventually sticks any known robotic mechanism, all such straight forward attempts had failed.

Other approaches based on controlled topologies such as crossbar topology have been implemented as described in PCT international patent publication number WO/2002/043432A1 to Arol et al. and PCT international patent publication numbers WO/2006/054279A1 and WO/2006/054300A2 to Avrahami et al. which are incorporated hereto by reference, in their entirety. It should be stated that controlled topologies such as crossbar topology suffer from ineffective utilization of operating space since ports are arranged in orthogonal linear lines, thus occupying large operating areas resulting in prohibitive size and cost for high port count devices. For example, a 200 by 200 switch may require a square operating area of 2 m by 2 m (at 10 mm connector size) where for comparison a square patch panel arrangement of same connectors (400 connectors, 10 mm each) may require an operating area of only 0.2 m by 0.2 m (1/100 area factor).

Still remains a need in the field of cable interconnection, for a method, device, assembly and system for facilitating controlled, physical cable cross connections, which may operate in the environment of complex crossed over cable topologies, while allowing for remote operation, size scale-up capabilities and the utilization of various effective connection and disconnection techniques.

SUMMARY OF THE INVENTION

The present invention is a method, device, assembly and system for facilitating the interconnection of communication bearing cables (e.g. fiber-optic lines), cables and/or connectors may be of a single or of multiple leads/fibers/channels. According to some embodiments, substantially each of a first set of cables may terminate with a connector, possibly of a first connector type, and substantially each of the cables' connectors from the first set of cables may rest in a respective parking slot within an interconnect-point support structure. The interconnect-point support structure may be positioned and operated in various orientations such as, but in no way limited to, vertical, horizontal or slanted orientations. According to further embodiments, substantially each of a second set of cables may terminate with a connector, possibly of a second connector type, and substantially each of the cables' connectors from the second set of cables may rest in a respective parking slot within the same or within another interconnect-point support structure. The first and second connector types may be adapted to mate with one another and to facilitate connectivity (e.g. optical) between cables connected to each. Alternatively, connectors of the first set may be similar to connectors of the second set and may connect to each other by an adaptor.

According to some embodiments of the present invention, a mechanical arm/pincer/threador may be adapted to release a connector of a first type from its parking slot, mobilize it to a parking slot of a connector of a second type and connect/mate the two. According to further embodiments, the mechanical arm/pincer/threador may be further adapted to disconnect a connector of a first type from a connector of a second type to which it is connected. The released connector may be pulled back to its respective parking slot while a conical shape may facilitate its return trip, through other connected cables, from the parking slot of the connector to which it was connected, back to its respective original parking slot. According to further embodiments of the present invention, the mechanical arm/pincer/threador may be adapted to mobilize a connector, which was disconnected by it, from the parking slot of the connector to which it was connected, back to its respective original parking slot.

According to some embodiments of the present invention, the mechanical arm/pincer/threador may have a slanted shape (i.e. hollow needle shaped). Slanted shape may facilitate access towards and entry into a cable connector's parking slot, when parking slot's opening is blocked by other cross connected cables, by clearing said other cross connected cables from its pass. The mechanical arm/pincer/threador may take the form of a single multi-purpose arm utilized for all functionalities or may actually comprise multiple arms wherein each arm is designed for its specific function.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 8A-8B schematically show an exemplary electromechanical arm/pincer/threador, in accordance with some embodiments of the present invention;

FIG. 9A-9B schematically show another exemplary electromechanical arm/pincer/threador, in accordance with some embodiments of the present invention;

FIG. 10A shows an exemplary connector that has a conical shape portion at one end—in this example at the end into which a cable enters, in accordance with some embodiments of the present invention;

FIGS. 10B-10D show an exemplary connector which connector's conical shape, along with its cable's pulling, enables/facilitates its passage through one or more areas of other cross connected cables, while travelling towards its destination parking slot, in accordance with some embodiments of the present invention;

FIG. 11 shows an exemplary interconnect cable support structure covered by a flexible material allowing an exemplary dragged connector sink into the surface, in accordance with some embodiments of the present invention;

FIG. 12 shows an exemplary connector-adaptor adapted to facilitate the connection of a connector of the first connector type with a connector of the second connector type, or to facilitate the connection of two similar connectors, in accordance with some embodiments of the present invention;

FIGS. 14A-14B show an exemplary single physical connection scheme, in accordance with some embodiments of the present invention, compared to an exemplary patching cable connection scheme which is used, in other cases, to bridge between two cable connectors of 'to be connected' cables;

FIGS. 20A-20C schematically show examples of interconnect-points sets arrangements, in accordance with some embodiments of the present invention, wherein:

FIG. 20A shows an exemplary rectangular arrays-arrangement;

FIG. 20B shows an exemplary circular arrays-arrangement; and

FIG. 20C shows an exemplary cylindrical arrays-arrangement.

FIGS. 21A shows an exemplary connection scheme between a cable interconnect-point/connector of a cable from a first set of cables parked in a parking slot of the first support structure, and a cable interconnect-point of a cable from a second set of cables parked in a parking slot of the second support structure, in accordance with some embodiments of the present invention;

FIGS. 21B shows an exemplary connection scheme between a cable interconnect-point/connector of a cable from a first set of cables parked in a parking slot of the first support structure, and a cable interconnect-point of a cable from a second set of cables parked in a parking slot of the second support structure, wherein the mechanical arm/pincer/threador is seen at the bottom-position of its range of movement, in accordance with some embodiments of the present invention;

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. Such apparatus may be specially constructed for the desired purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

SUMMARY

Figure 1:
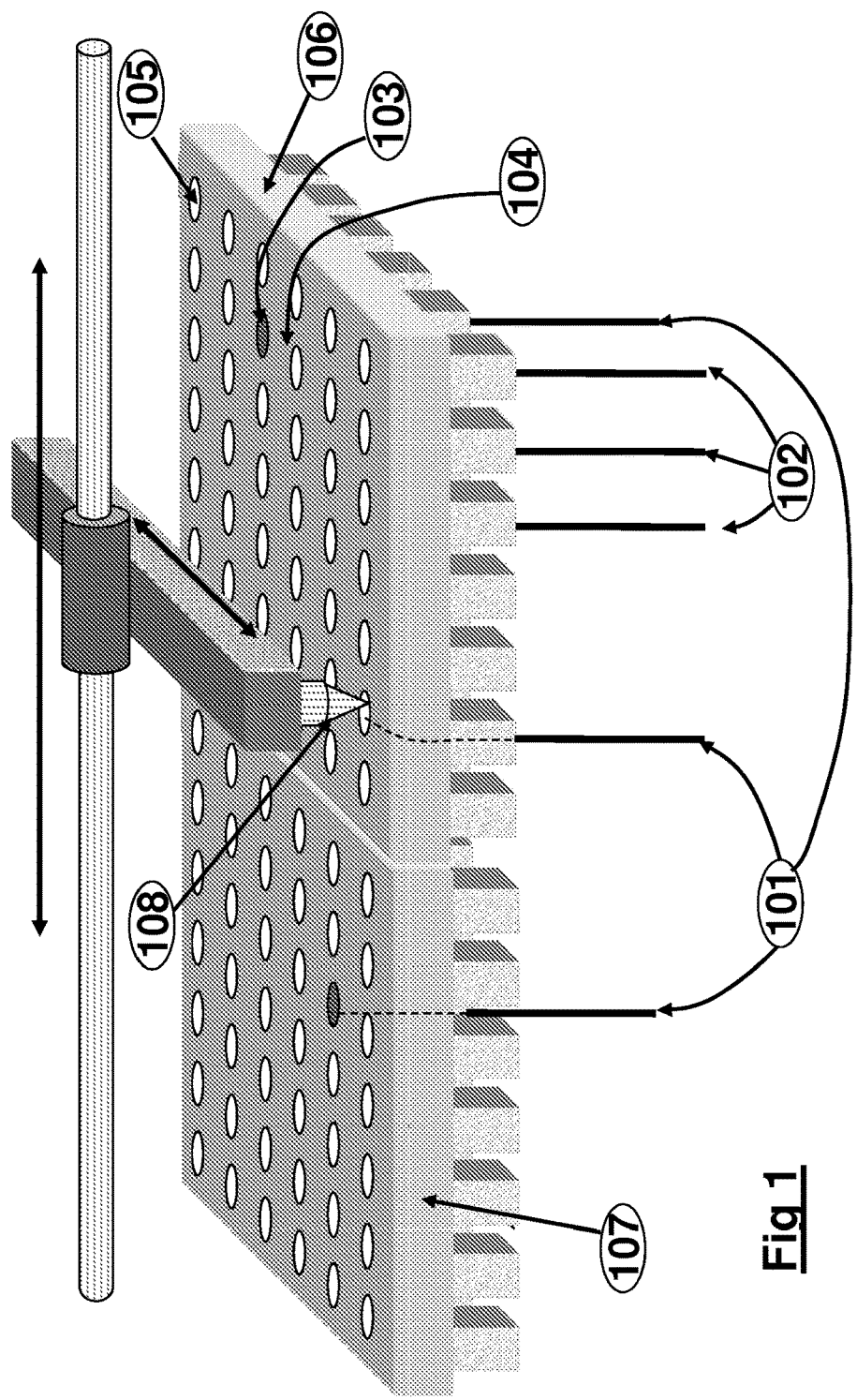
FIG. 1 is a drawing of an exemplary cable interconnecting device, in accordance with some embodiments of the present invention.
Figure 2A:
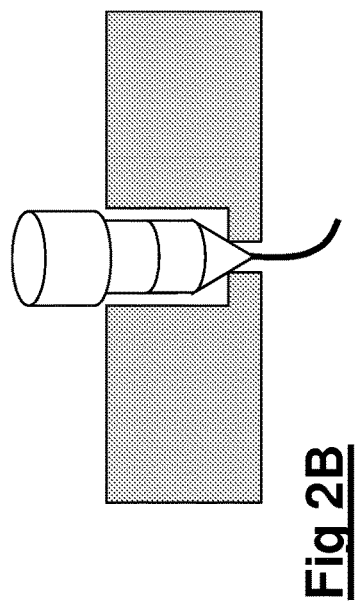
FIGS. 2A-2D show an exemplary cable connection scheme wherein a connector of a first type is released from its parking slot, mobilized to a parking slot of a connector of a second type and the two are connected/mated, in accordance with some embodiments of the present invention.
Figure 2B:
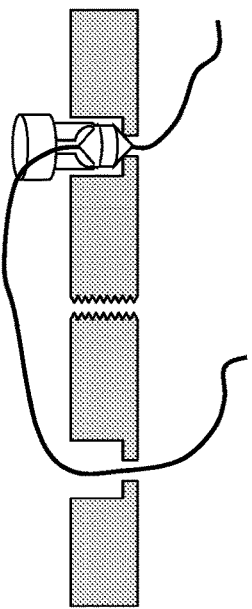
Figure 2C:
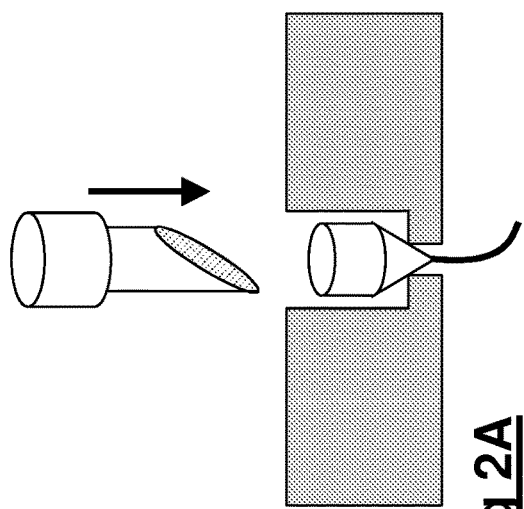
Figure 2D:
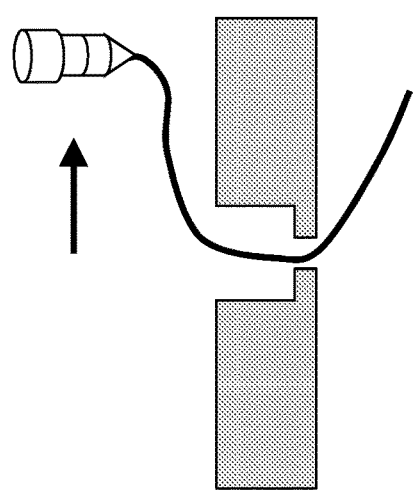

The present invention is a method, device, assembly and system for facilitating the interconnection of communication bearing cables (e.g. fiber-optic lines) (FIG. 1), cables and/or connectors may be of a single or of multiple leads/fibers/channels. According to some embodiments, substantially each of a first set of cables (101) may terminate with a connector, possibly of a first connector type (103), and substantially each of the cables' connectors from the first set of cables may rest in a respective parking slot (105) within an interconnect-point support structure (106). The interconnect-point support structure may be positioned and operated in various orientations such as, but in no way limited to, vertical, horizontal or slanted orientations. According to further embodiments, substantially each of a second set of cables (102) may terminate with a connector, possibly of a second connector type (104), and substantially each of the cables' connectors from the second set of cables may rest in a respective parking slot within the same or within another interconnect-point support structure (107). The first and second connector types may be adapted to mate with one another and to facilitate connectivity (e.g. optical) between cables connected to each. Alternatively, connectors of the first set may be similar to connectors of the second set and may connect to each other by an adaptor.

Figure 3A:
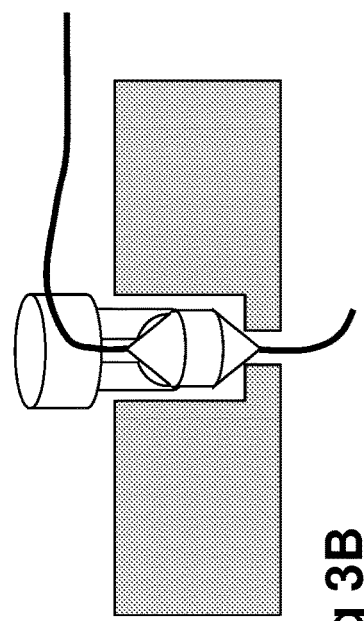
FIG. 3A-3C show an exemplary cable disconnection scheme wherein a connector of a first type is disconnected from a connector of a second type to which it is connected, in accordance with some embodiments of the present invention.
Figure 3B:
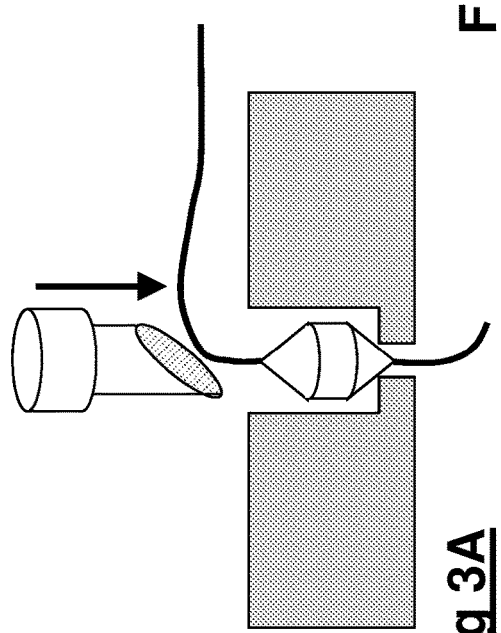
Figure 3C:
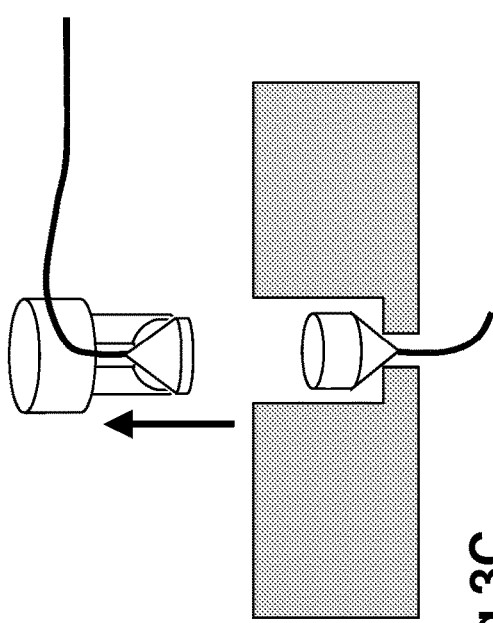
Figure 4:
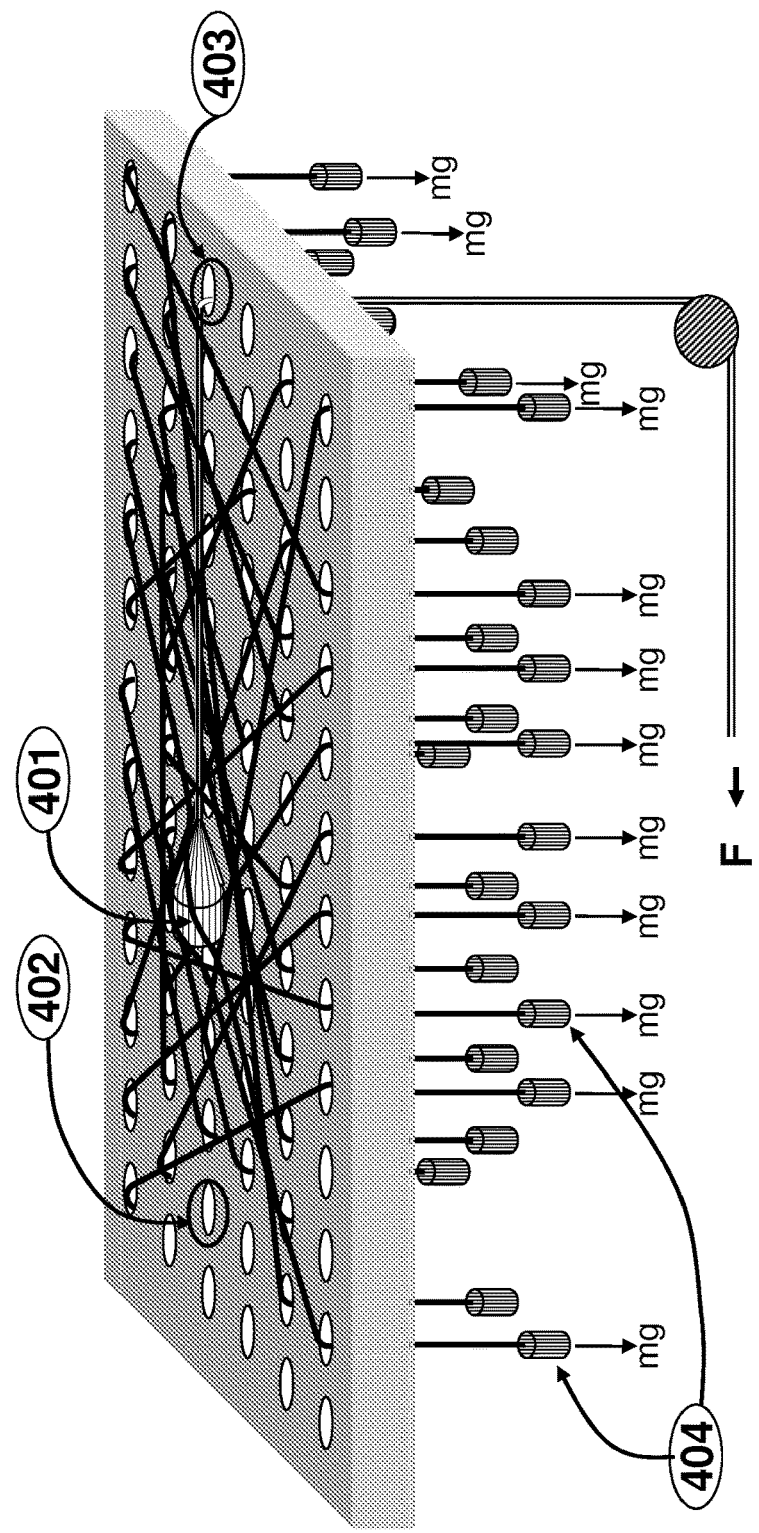
FIG. 4 shows an exemplary released connector being pulled back to its respective parking slot while its conical shape facilitates its return trip, in accordance with some embodiments of the present invention.

According to some embodiments of the present invention, a mechanical arm/pincer/threador (108) may be adapted to release a connector of a first type from its parking slot, mobilize it to a parking slot of a connector of a second type and connect/mate the two (FIG. 2A-D). According to further embodiments, the mechanical arm/pincer/threador may be further adapted to disconnect a connector of a first type from a connector of a second type to which it is connected (FIG. 3A-C). The released connector may be pulled back to its respective parking slot (FIG. 4) while a conical shape (401) may facilitate its return trip, through other connected cables, from the parking slot of the connector to which it was connected (402), back to its respective original parking slot (403). According to further embodiments of the present invention, the mechanical arm/pincer/threador may be adapted to mobilize a connector, which was disconnected by it, from the parking slot of the connector to which it was connected, back to its respective original parking slot. The mechanical arm/pincer/threador may take the form of a single multi-purpose arm utilized for all functionalities or may actually comprise multiple arms wherein each arm is designed for its specific function.

Cables

According to some embodiments of the present invention, inter-connected cables may be of an optical fiber type, an electrical wire type, coax cable type, of any combination of said cables; or of any other type or combination of communication bearing cable types known today or to be devised in the future.

According to further embodiments of the present invention, some or all of the inter-connected cables may comprise two or more separate fibers each, as to provide a device for inter-connecting of pairs triplets etc. commonly used in communication networks having separate send and/or receive and/or other channels or channel types that may be used simultaneously/in-parallel. Furthermore, at least some of the cables may comprise at least one fiber and at least one electrical wire. The electrical wire may be used to electrically detect a given connection configuration of the interconnect device at given points in time.

According to some embodiments of the present invention, connection and/or disconnection of single-mode and/or multi-mode cables/fibers may be facilitated, whereas single-mode cables may be used for long range communication transmission and multi-mode cables may be used in the vicinity of data centers and/or central offices.

Retaining

According to some embodiments of the present invention, one or more retention mechanisms may be used for retaining cables' slacks, which cables' slacks may allow for the mobilization of the cables' interconnect-points towards their destination slots. According to further embodiments of the present invention, retention mechanisms may utilize springs, weights, controlled actuated pulleys, or any other mechanical or electromagnetic means known today or to be devised in the future, in order to enable cable retention.

According to some embodiments of the present invention, such a pulley(s) and/or spring(s) and/or weight(s) based and/or other retaining device/system (FIG. 4, 404) may be connected to some or all of the connectors' cables on the interconnect-point support structure's side opposite to its connectors' parking slots side (e.g. a weight(s) based retaining device/system from below the interconnect-point support structure). This may retain a substantially constant pull on these cables, thus controlling, preventing and/or minimizing the creation and/or amount of slack/freedom of these cables and their connectors.

Figure 5B:
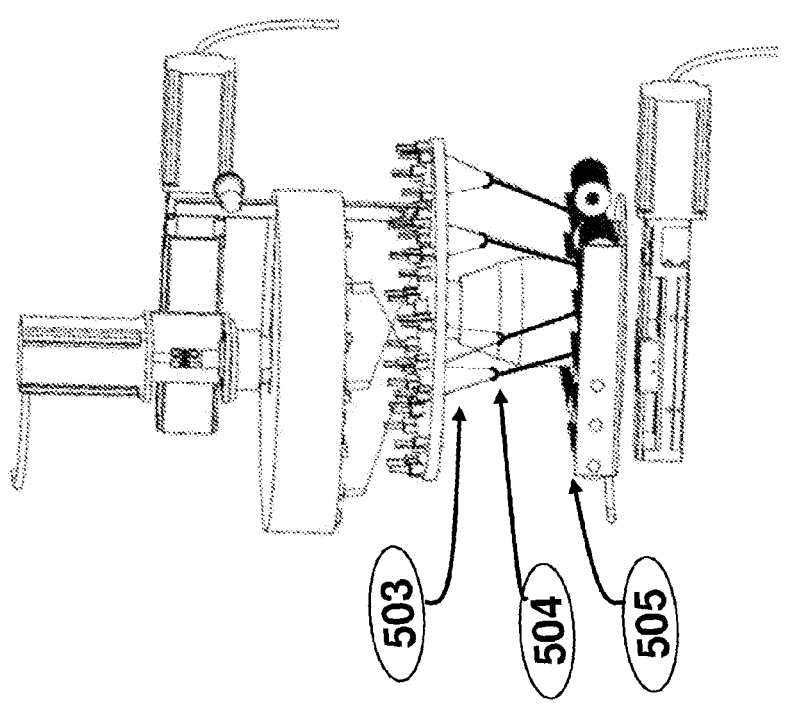
FIG. 5B shows an exemplary patching cables' banana/horse-shoe shaped tube and an exemplary pulling actuator that may be used for increasing the pulling force on a cable, in accordance with some embodiments of the present invention.
Figure 5A:
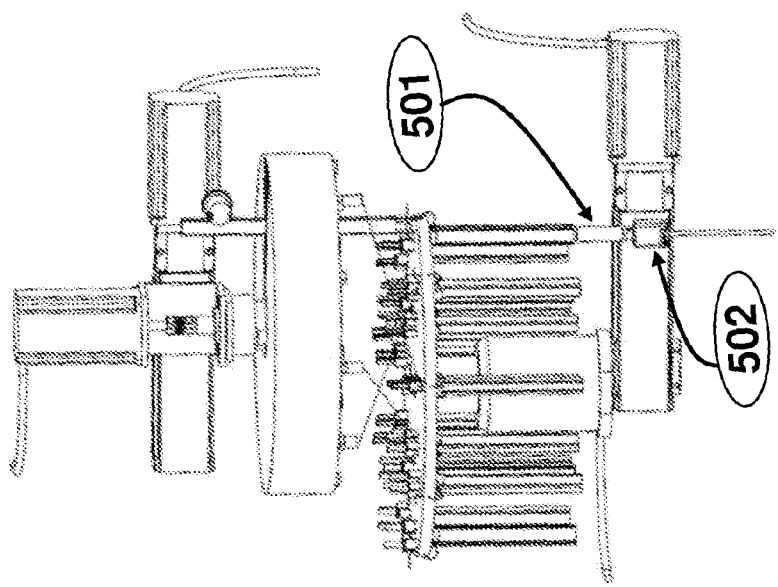
FIG. 5A shows an exemplary gripper and an exemplary pulling actuator that may be used for increasing the pulling force on a cable, in accordance with some embodiments of the present invention.

According to some embodiments of the present invention, a gripper (FIG. 5A) (501) and/or a pulling actuator (502) may be used for increasing the pulling force (e.g. of the cable patch) as part of a disconnection scheme. According to further embodiments of the present invention, one or more patching cables (FIG. 5B) (503) may be pulled-down and thus retained by a wire attached to the patch by a substantially banana/horse-shoe shaped tube (504) that may slide freely on its respective patch cable. The banana/horse-shoe shaped tube may limit the bending radius of the cable and thus prevent cable over-bending that may result in cable damage or malfunction. Pulling wires may be actuated, for example, by a spiral springs mechanism (505) comprising a corresponding spring for each or some of the wires.

Figure 5D:
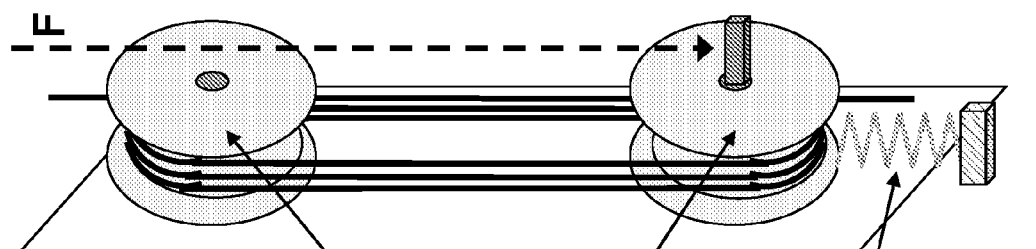
FIGS. 5C-5D show an exemplary retention mechanism in accordance with some embodiments of the present invention.
Figure 5C:
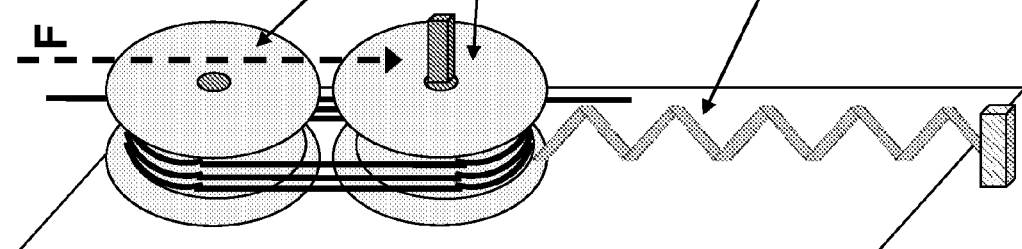

According to further embodiment of the present invention, a retention mechanism (FIGS. 5C-5D) may combine between passive and active retention configurations. According to some exemplary embodiments, as part of the release of a first cable connector from its parking slot, by the mechanical arm, a spring (FIG. 5C, 502) may be stretched and loaded. The loaded spring may offer a constant pull on the cable throughout the process of the first connector's connection to a second connector and through their passive 'connected' status. Pursuant to the disconnection of the first connector from the second connector, the mechanical arm may travel to and descend into the first connector's original parking slot pushing downward all or part of the retention mechanism (FIG. 5D, 501) thus adding an active pulling force to the spring's passive/constant pull on the cable and facilitating the dragging of the first cable connector back to its original parking slot as further described hereinafter.

Arm

According to some embodiments of the present invention, the mechanical arm/pincer/threador (FIG. 1, 108) may be mechanically operated in stages, wherein the arm is initially mobilized in the X and then the Y direction to its required position facing (e.g. above) the cable parking slot it is about to approach. Once positioned, the respective arm may be advanced (e.g. lowered) in the Z direction towards the parking slot, engaged and lifted. According to further embodiments of the present invention, there may be provided a control-logic functionally associated with a data structure (e.g. database table, lookup table, etc.) which includes mapping information between cable designators and slot designators. When the control logic receives a command (manually or from a fiber routing controller system) to connect/disconnect a set of two or more connectors.

Figure 6:
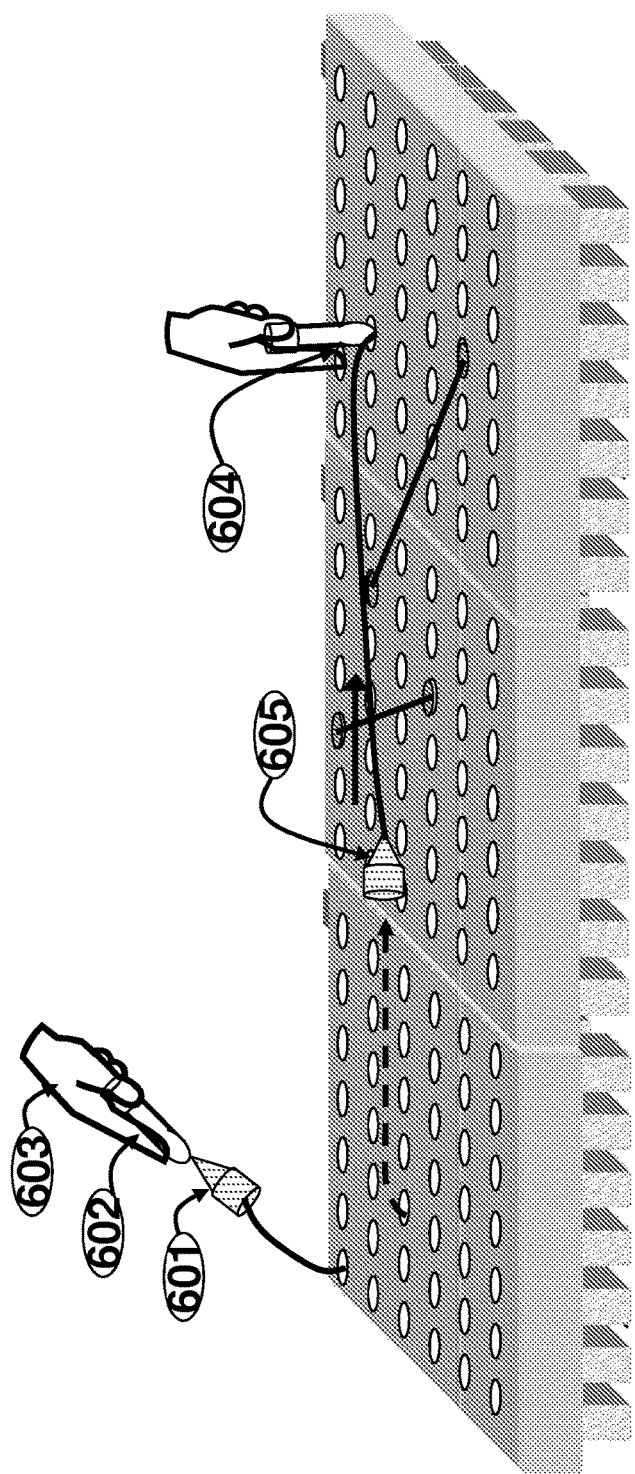
FIG. 6 shows an exemplary manually operated arm/pincer/threador that may be used to connect/disconnect and/or move/remove a cable connector, in accordance with some embodiments of the present invention.

Alternatively, the arm may be manually operated (FIG. 6). A handheld arm/pincer/threador (603) may be used to disconnect and/or remove (602) a cable connector (601) from its parking slot or to connect and/or insert it (604) into a parking slot (e.g. after it has been disconnected and pulled through one or more areas of other cross connected cables (605) to its respective original parking slot). The handheld arm/pincer/threador may also be used to provide pulling force by engaging a disconnected connector's respective cable (604) pushing the cable substantially downward into the parking slot, and thus pulling its connector through one or more areas of other cross connected cables. According to some embodiments of the present invention, connector's connection/disconnection to/from another connector; connector's insertion/removal into/from a parking slot; connector's pulling through one or more areas of other cross connected cables; and/or any other related functionality may be executed by a single multi-purpose tool for all functionalities or by custom tools, each of which is designed for its specific function.

Figure 7B:
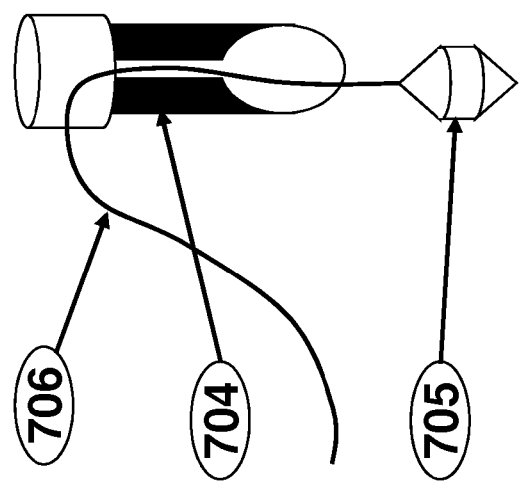
FIG. 7B shows an exemplary mechanical arm/pincer/threador, demonstrating how its open side allows for the escape of a connector's cable, in accordance with some embodiments of the present invention.
Figure 7A:
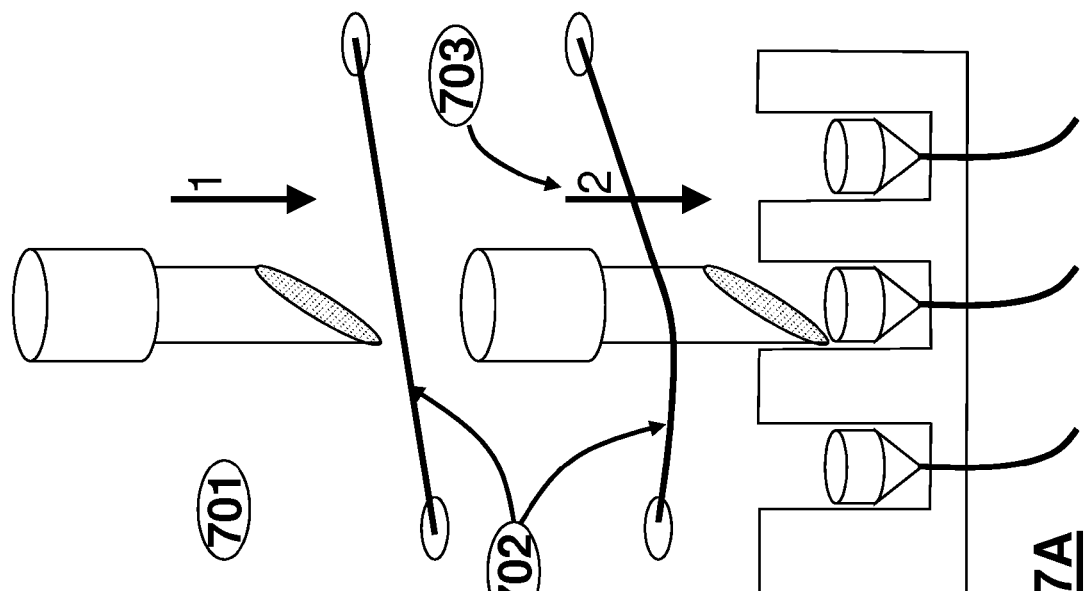
FIG. 7A shows an exemplary mechanical arm/pincer/threador, demonstrating how its slanted shape facilitates its access towards and entry into a cable connector's parking slot, when parking slot's opening is blocked by other cross connected cables, in accordance with some embodiments of the present invention.

According to some embodiments of the present invention, the mechanical arm/pincer/threador may have a slanted (i.e. hollow needle shaped) (FIG. 7A). Slanted shape (701) may facilitate access towards and entry into a cable connector's parking slot, when parking slot's opening is blocked by other cross connected cables (702), by clearing said other cross connected cables from its pass (703). According to further embodiments, the mechanical arm/pincer/threador (FIG. 7B) may have an open side to it (704), possibly on its shorter side, which may facilitate the mechanical arm/pincer/threador's entry into a parking slot of a first connector to which a second connector is currently connected (705), by allowing the escape of the second connector's cable from the grip of the mechanical arm/pincer/threador (706). According to further embodiments, the mechanical arm/pincer/threador may be further adapted to vibrate, thus assisting the clearing of said other cross connected cables from its pass (703).

Reference is now made to FIGS. 8A, 8B, 9A and 9B, where there are shown, in accordance with some embodiments of the present invention, exemplary mechanical arms/pincers/threadors. The exemplary pincer arm (801, 901) may comprise a slot with a spring loaded door (802) that may allow the pincher arm (801, 901) to penetrate through the support structure while the spring loaded door retreats. Upon passing the support structure, the spring loaded door may close as to prevent any crossing fiber to enter into the free corridor. The lower section (803, 903) of the pincer arm may comprise a substantially sharp tip that may gradually increase in thickness, as to push-aside and clear crossing cables situated along its pass without damaging the pushed aside cables. Upon exerting the pincer arm through the supporting structure the door may retreat to the opposite direction.

Connector Dragging

According to some embodiments of the present invention, connectors of the first connector type and/or connectors of the second connector type may have a narrowing (e.g. conical, pyramid like) structure/shape portion at one end—for example at the end into which a cable enters (FIG. 10A). According to some embodiments, the cable of a disconnected cable connector may be pulled (e.g. by a pulling mechanism/motorized control) from a location on the opposite side (e.g. below) of the interconnect-point support structure (i.e. on the side of the support structure, opposite to the side of the disconnected cable connector) (FIG. 10B; 1001). The disconnected connector's conical shape, along with its cable's pulling, may thus enable/facilitate the connector's passage through one or more areas of other cross connected cables (102), while the pulling force propels the connector forward and its conical shape clears cross connected, or other, cables in its passage (FIG. 10B-D). According to further embodiments, the pulling force exerted on the cable may be either constant or varying.

According to some embodiments of the present invention, connectors of the first connector type and/or connectors of the second connector type may accordingly be dragged to their respective interconnect-point support structure parking slots (FIG. 10D; 1003). According to further embodiments, connectors of the first connector type and/or connectors of the second connector type may be adapted to fit into a parking slot sleeve having a conically shaped hosting portion at one or both of its ends.

Figures 10E, 10F:
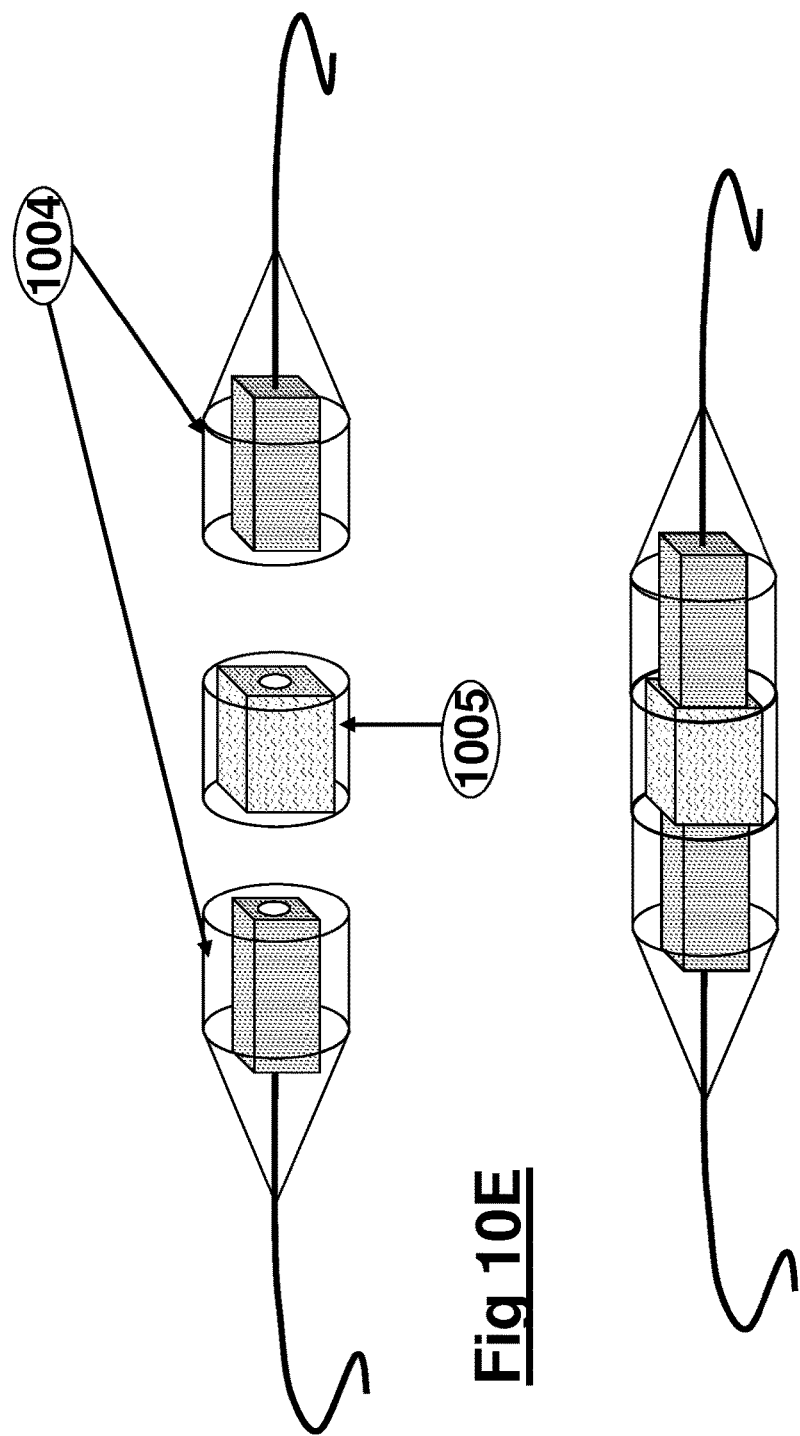
FIGS. 10E-10F show exemplary non-conical connectors and adaptor wearing conical jackets and compatible adaptor jacket for facilitating their passage through one or more areas of other cross connected cables, in accordance with some embodiments of the present invention.

According to some embodiments of the present invention, non-conical, non-pyramid like and/or any other non-pointed connectors may be fitted with jackets (FIG. 10E, 1004). Jackets may be of conical, pyramid like or of other pointed shape and may thus facilitate the dragging of a connector 'wearing' such a jacket through one or more areas of other cross connected cables. Connection adaptors may also be fitted with Jackets (1005) in order to enable or improve their connection to jacket 'wearing' connectors. An example of Jacket-'wearing' connectors connected by a Jacket-'wearing' adaptor is shown in FIG. 10F.

Reference is now made to FIG. 11 where there is shown in accordance with some embodiments of the present invention, an exemplary interconnect-point support structure that may be made of or covered by a layer of a flexible/squeezable material (e.g. Teflon) (1101). The flexible/squeezable surface may further facilitate the connector's passage through one or more areas of other cross connected cables by allowing it to sink into the surface on top of which it is dragged (1102). Furthermore, the flexible/squeezable surface may allow for an easier entry of a dragged cable connector into its respective parking slot by allowing the parking slots' edges/rims to band and create an inclined ramp on which the connector may more easily be pulled (1103).

Cable Free Area and Adaptors

According to some embodiments of the present invention, connectors of the first connector type and/or connectors of the second connector type to be connected may be mobilized through one or more areas of cross connected cables to a substantially cable free area where a mechanical arm/pincer/threador may grip and mate it with a connector of the other type, and/or with another identical connector—in cases in which first and second type connectors are identical. Furthermore, a connector-adaptor (FIG. 12; 1201), may be adapted to facilitate the connection of a connector of the first connector type (1202) with a connector of the second connector type (1203) or to facilitate the connection of two similar connectors to each other, and may also be mobilized through the one or more areas of cross connected cables to a substantially cable free area, either along with a mobilized connector, or in a separate journey.

Figure 13A:
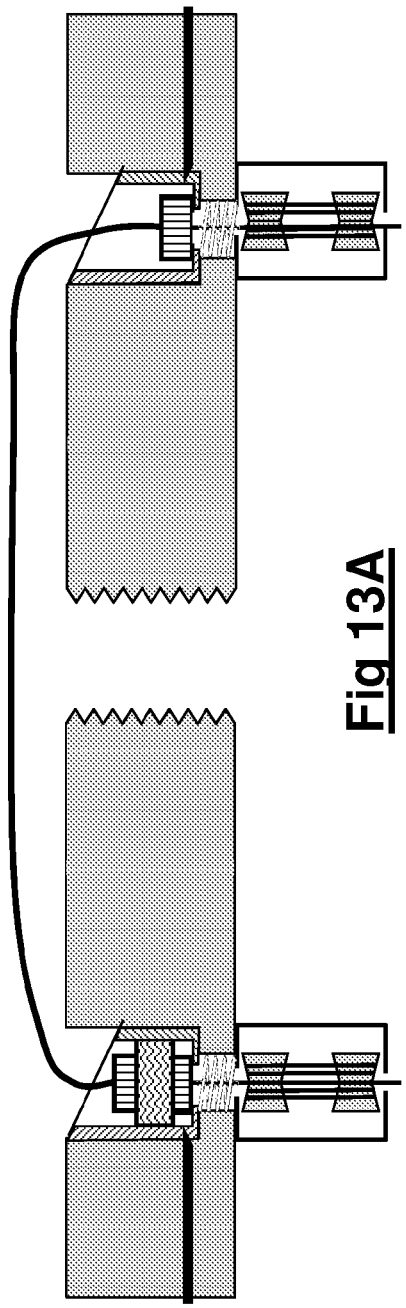
FIGS. 13A-13E show exemplary connector housings adapted to eject/erect out of the interconnect-point support structure and some of their exemplary utilizations, in accordance with some embodiments of the present invention.
Figure 13B:
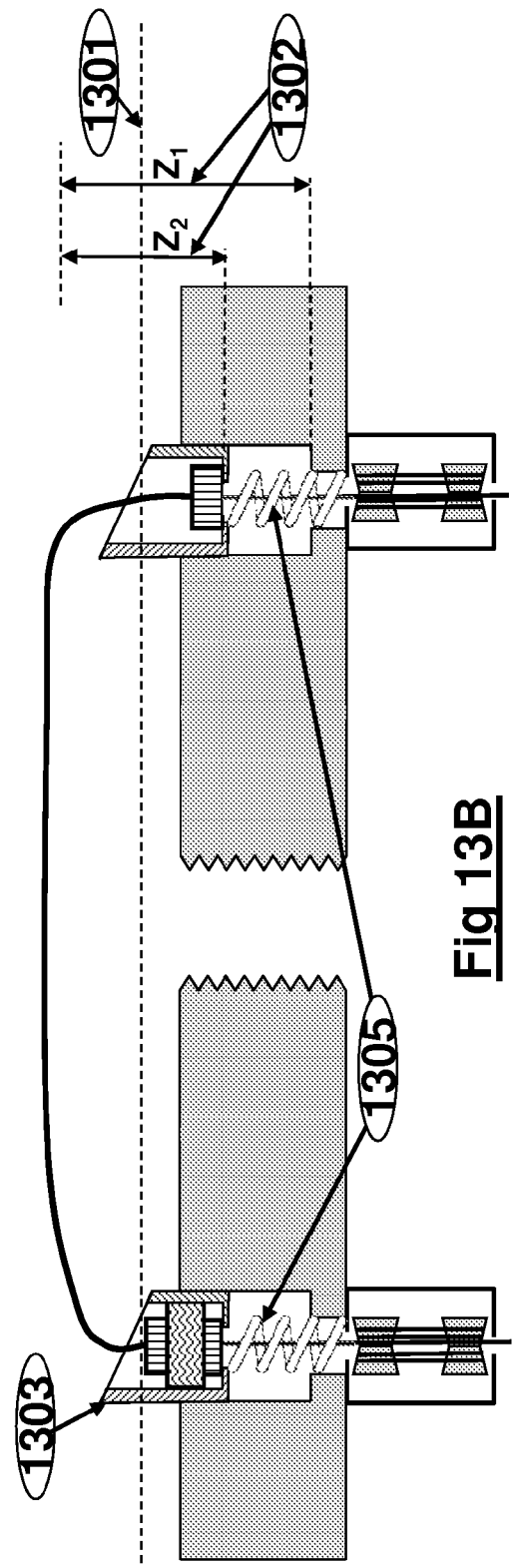

According to some embodiments of the present invention, one or more connector housings parked inside the connector parking slots (FIG. 13A) may be adapted to eject/erect out of the interconnect-point support structure (FIG. 13B), thus allowing for the creation of a cable free plane, substantially parallel to the support structure plane (1301). Ejected/erected slots may allow for easier recognition and/or connection/disconnection of connectors to these slots and may shorten the distance (e.g. from Z1 to Z2) travelled by the arm/pincer/threador in the Z axle prior to a connection/disconnection, by approaching it (1302). According to some embodiments, the connector housings may be of a slanted shape. Slanted shape may clear aside concurrently connected cables from a given connector housing's pass, as it is ejected/erected from its respective slot (1303).

Figure 13C:
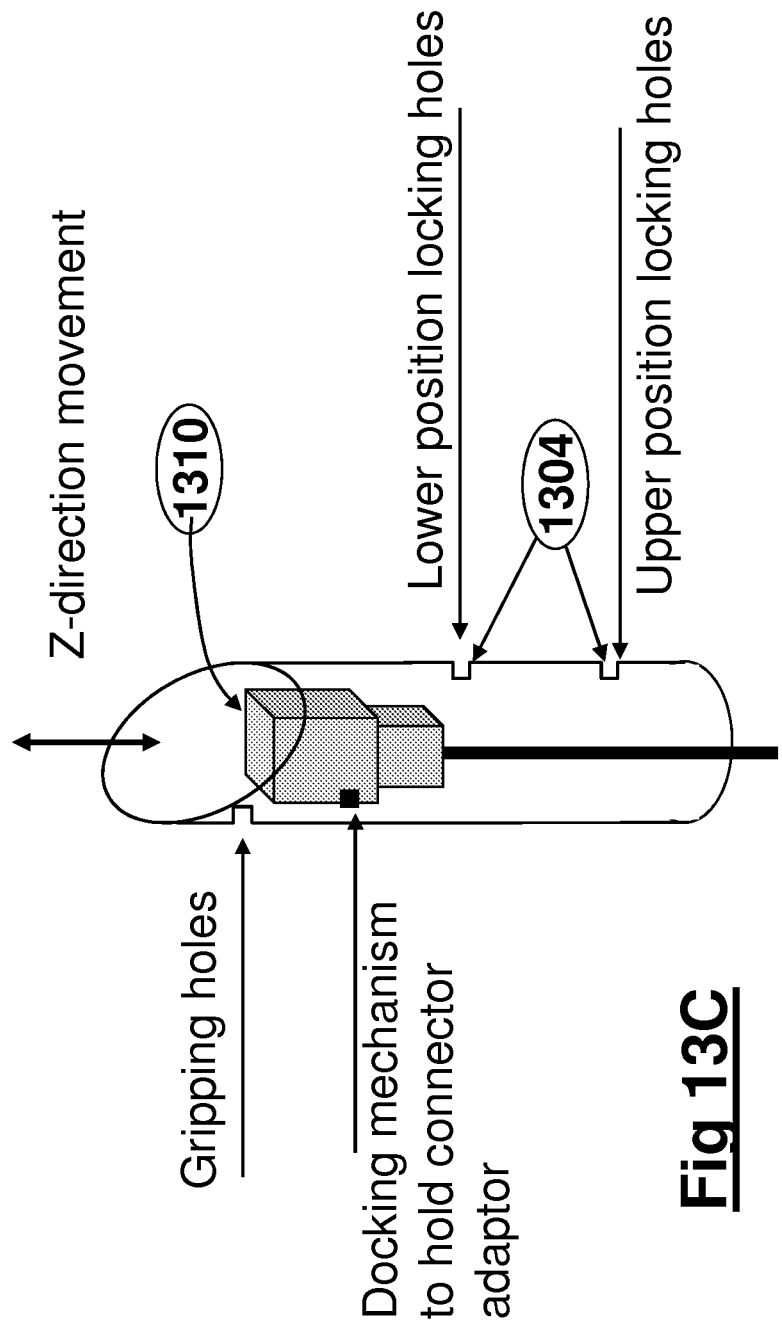

According to some embodiments of the present invention, the connector housings (FIG. 13C) may comprise two retaining/locking holes set at different heights along its length, adapted to affix it in either a regular (lower) or ejected/erected (upper) position (1304). According to further embodiments, connector housings may comprise a spring, or other flexible mechanism (13B, 1305), adapted to cause it to pop up and out of its respective slot upon initiation, according to further embodiments, the spring/mechanism may be pushed back into its slot and reloaded by the arm/pincer/threador, possibly as part of a connection or disconnection scheme.

Figure 13D:
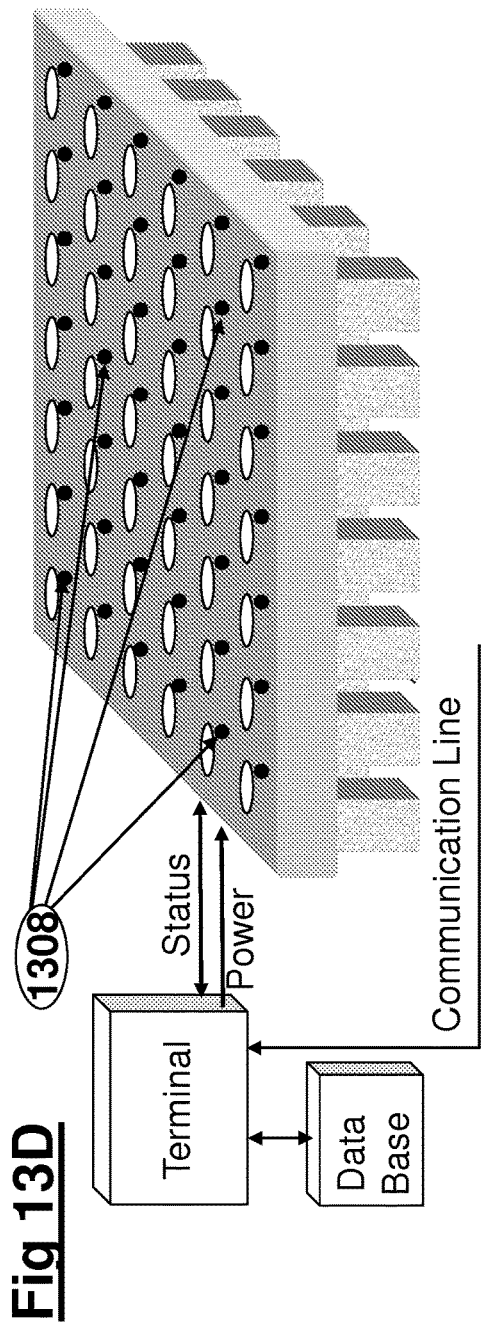
Figure 13E:
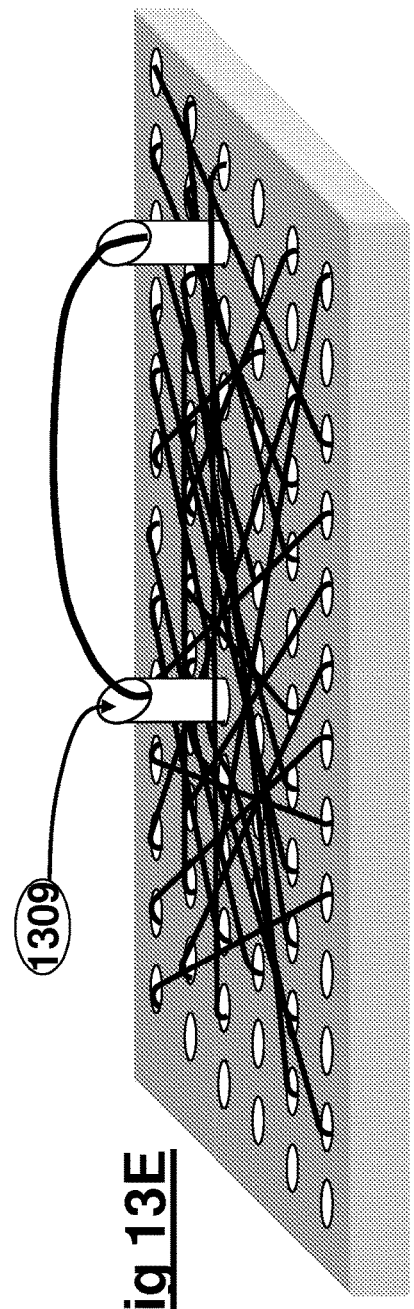

According to further embodiments of the present invention, there may be provided a control-logic/terminal (FIG. 13D, 1306) that may be functionally associated with a data structure (e.g. database table, lookup table, etc.) (1307) which includes mapping information listing cable designators and their respective slot designators, currently connected cables and/or cables to be connected/disconnected next. When the control logic receives a command (manually or from a fiber routing controller system) to connect a given set of cables it may activate LED indicators (1308) and/or eject/erect connector housings corresponding and indicative of the connectors/cables to be connected (FIG. 13E, 1309). Furthermore, by keeping record of active connections the control-logic may be adapted to control the electrical flow to/from the panel and to/from active connections.

Any to Any+Scale Up

According to some embodiments of the present invention, the assembly/system for interconnecting communication bearing cables may enable the connection of substantially any of its cable connectors and the cable attached to it, to substantially any of the other cable connectors and the cable attached to it, as long as connector compatibility, between the two 'to be connected' connectors, exists; and/or as long as one of the 'to be connected' connectors has an adaptor attached to it, in cases where connection compatibility requires one of the connectors to 'wear' an adaptor. According to further embodiments, connection may be established through a single physical connection act (FIG. 14A; 1401), as this configuration may negate the need for a patching cable (FIG. 14B; 1402); which is used, in other cases, to bridge between two cable connectors of 'to be connected' cables, and that inherently necessitates two connections (1403, 1404), one for each of the patching cable's tips.

Figures 15A, 15B, 15C:
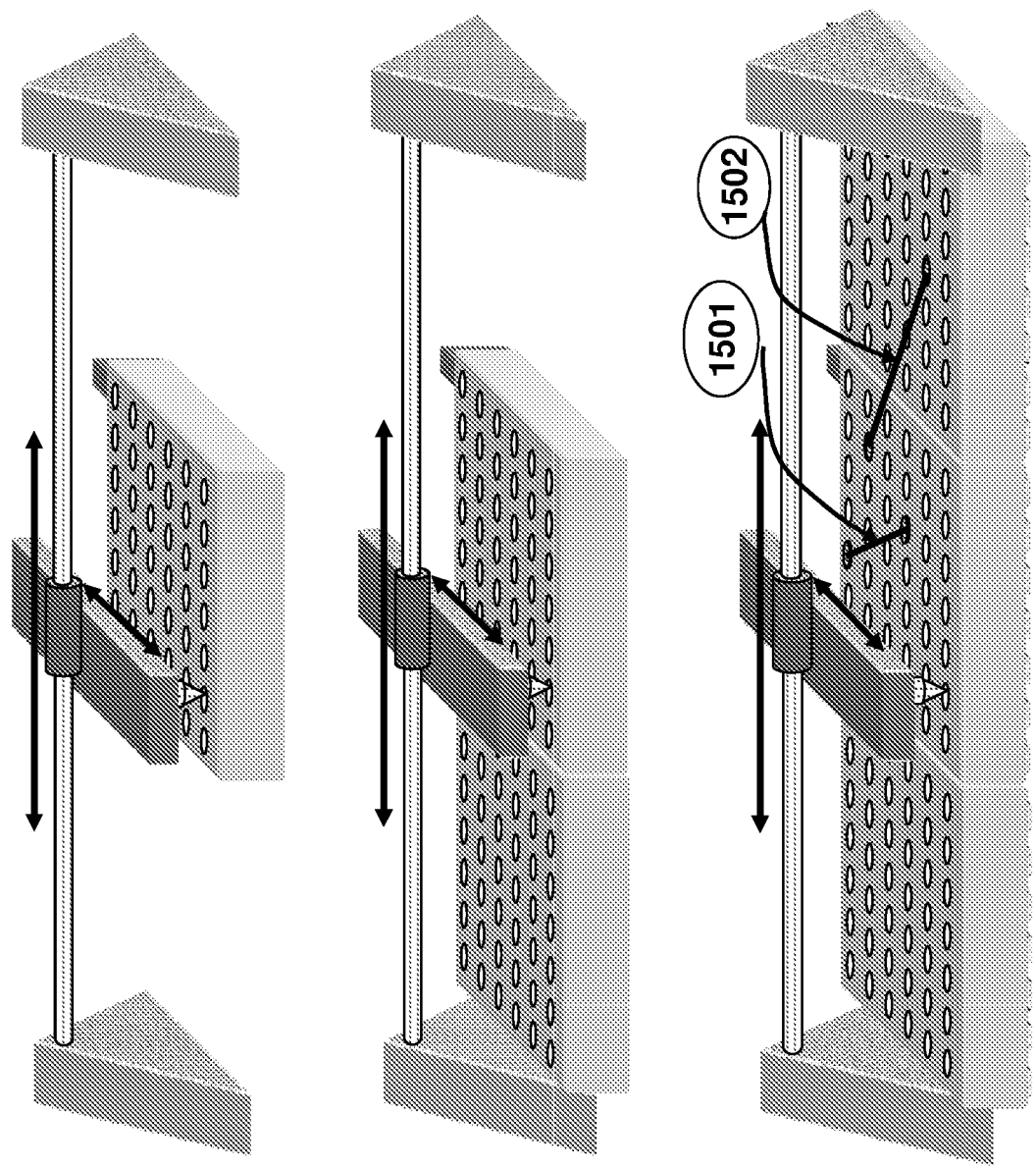
FIGS. 15A-15C show an exemplary assembly/system for interconnecting communication bearing cables which is modular and thereby facilitates its scaling up with one or more additional interconnect-point support structures, in accordance with some embodiments of the present invention.

According to some embodiments of the present invention, the assembly/system for interconnecting communication bearing cables may be modular, thereby facilitating its scaling up with one or more additional interconnect-point support structure(s) (FIG. 15 A-C). According to further embodiments, the one or more interconnect-point support structure(s) may be added without affecting ongoing communication traffic taking place during scale-up, which may also enable for field scale-up. Upon termination of the scale-up procedure, substantially any cable connector, parked in a slot of the pre scale-up one or more interconnect-point support structure(s), may be connected (or disconnected and reconnected if currently connected) to substantially any of the one or more cable connector(s), having a compatible connector, parked in slot(s) of either the pre scale-up interconnect-point support structure(s) (1501) and/or the added interconnect-point support structure(s) (1502).

Plant Oreration

Figure 16:
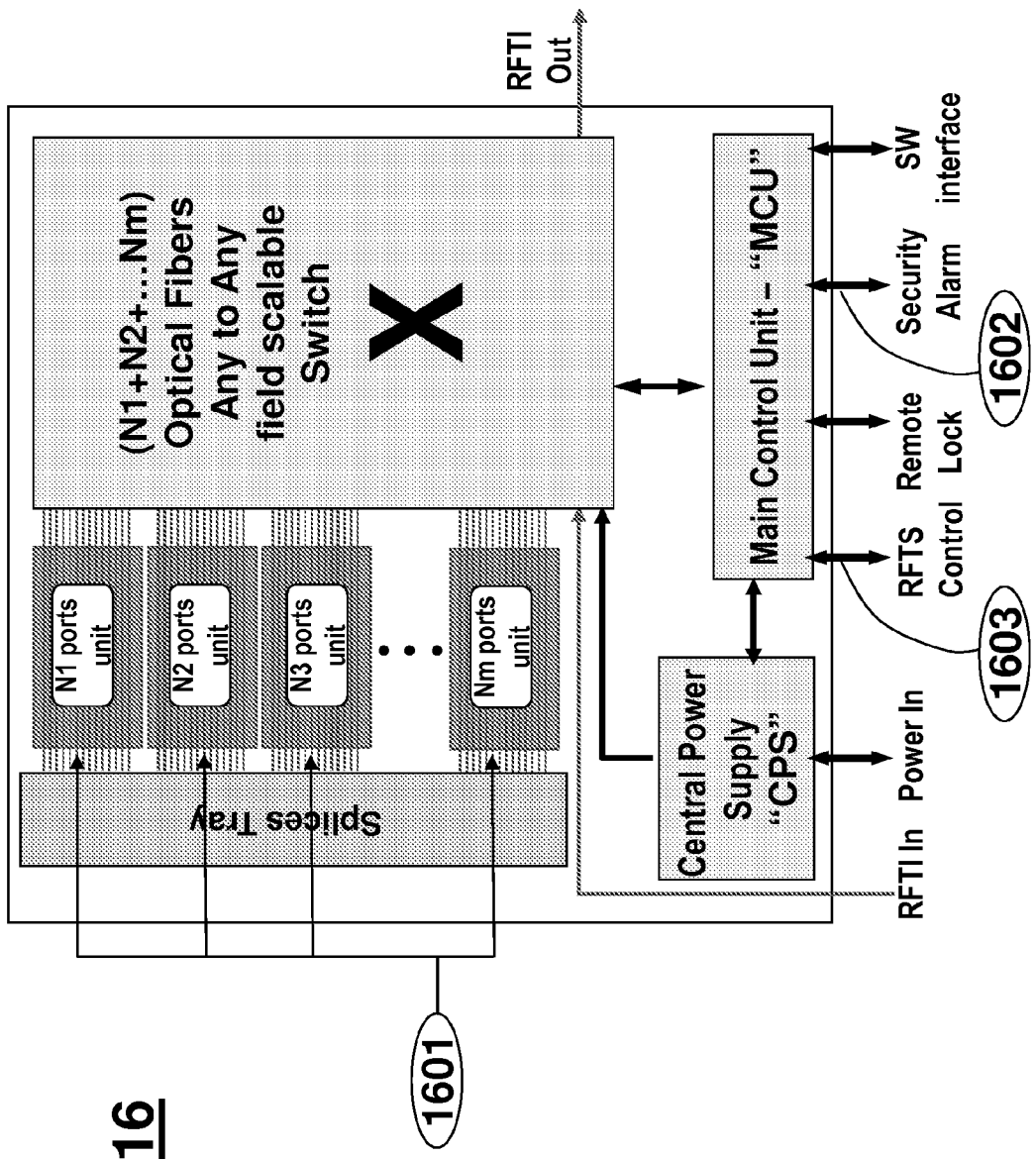
FIG. 16 shows an exemplary assembly/system for interconnecting communication bearing cables that may target any size and any application that requires any to any field scalable automated fiber management connectivity, in accordance with some embodiments of the present invention.

According to some embodiments of the present invention, an exemplary assembly/system for interconnecting communication bearing cables, such as, but in no way limited to, a non FTTH (Fiber To The Home) PON (Passive Optical Network) system (FIG. 16), may target any size and any application that requires any to any field scalable automated fiber management connectivity. According to some exemplary embodiments, any cable connector from port units N1 through Nm (1601) may connect to any other cable connector from port units N1 through Nm. Accordingly, the number of port units and/or the number of ports in one or more units may be changed while offering field-scalable, automated fiber management and connectivity.

According to further embodiments, one or more security-alarm ports (1602) and one or more remote lock ports (1603) may be adapted to alert, and remotely lock the system/assembly's switch, respectively—in the event of an unauthorized access to the system.

Figure 17:
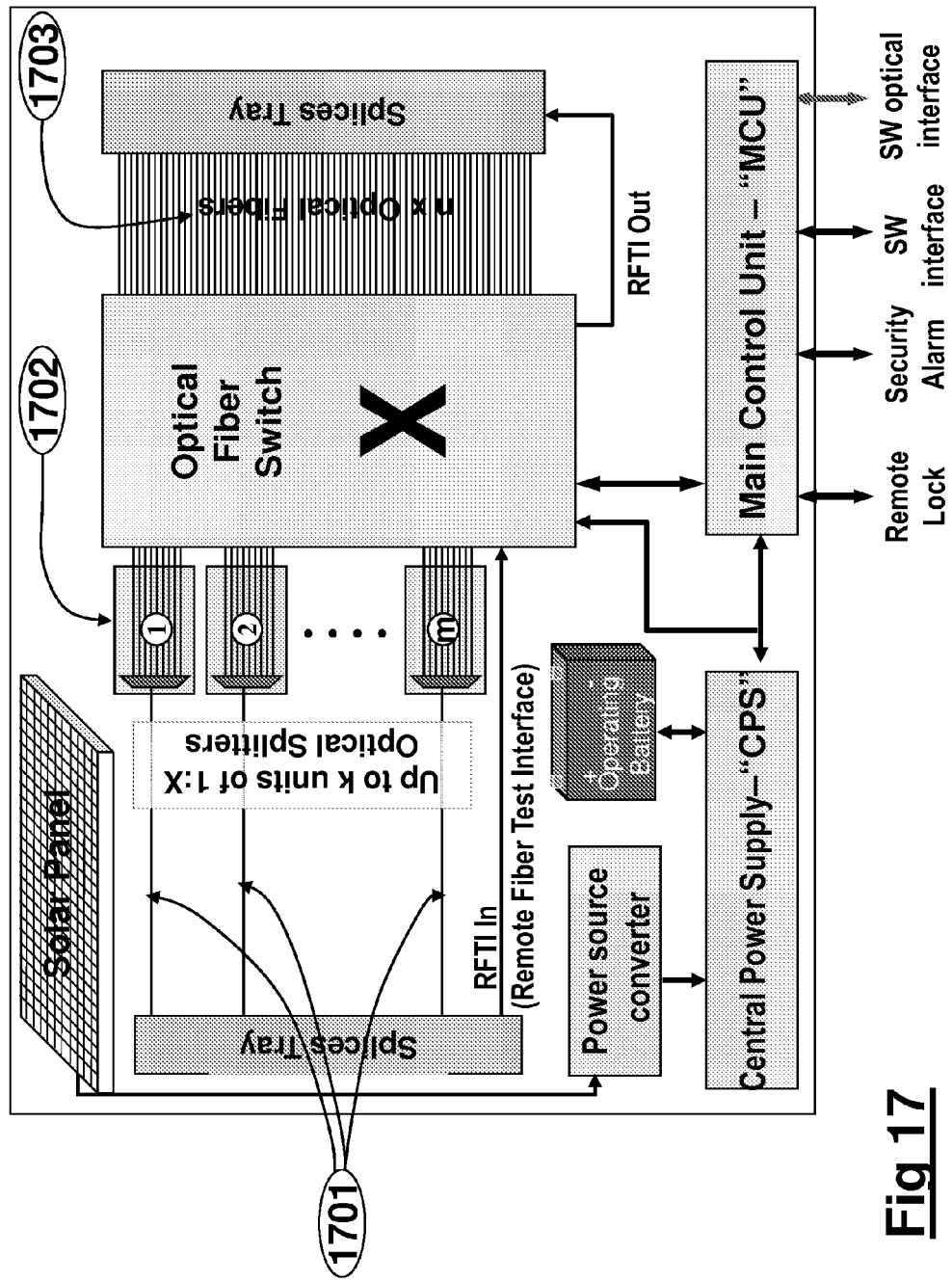
FIG. 17 shows an exemplary assembly/system for interconnecting communication bearing cables adapted to facilitate the connection of one or more of its cables, operating as feeder cables, to splitters, in accordance with some embodiments of the present invention.

According to some embodiments of the present invention, the assembly/system/switch for interconnecting communication bearing cables (FIG. 17) may be adapted to facilitate the connection of one or more of its cables, operating as feeder cables (1701), to splitters (e.g. built in splitters) (1702). Each splitter may output the content fed into it by its feeder cable to multiple cables (2, 4, 8, 16 etc.) entering the assembly/system/switch, through which content may be delivered to any one or more of its potential users connected to the assembly/system/switch (e.g. by connection to respective subscriber lines).

Figure 18A:
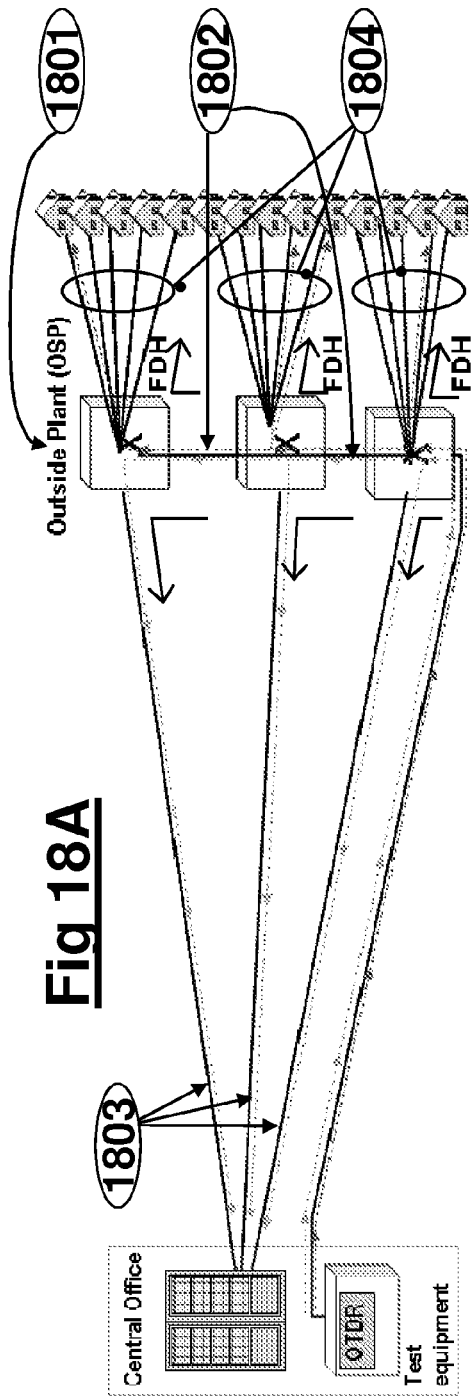
FIG. 18A shows an exemplary assembly/system for interconnecting communication bearing cables wherein one or more dedicated cable(s) and/or dedicated wavelengths are allocated for remote testing functionalities, in accordance with some embodiments of the present invention.

According to some embodiments of the present invention, The potential number of communication bearing cables leaving the assembly/system/switch may thus reach the number of splitters used multiplied by the number of splits facilitated by a single such splitter (1703). According to other embodiments of the present invention, output cables from splitters having different splitting ratios may also be combined into the same assembly/system/switch for further connection. According to some embodiments of the present invention, one or more dedicated cable(s) and/or dedicated wavelengths may be allocated for remote testing functionalities (FIG. 18A).

As the Outside Plants (1801), may be connected between them (1802), optical, or other, signals from testing equipment arriving through one of the outside plants may be routed to one or more of the remaining Outside Plants, and may thus be used for testing any of the Outside Plants' connections to the Central Office (1803) and/or any of the Outside Plants' connection to any of the subscribers (1804), and/or testing of any segment of the link—the feeder cable, splitter, subscriber cables, network termination units etc.

Figure 18B:
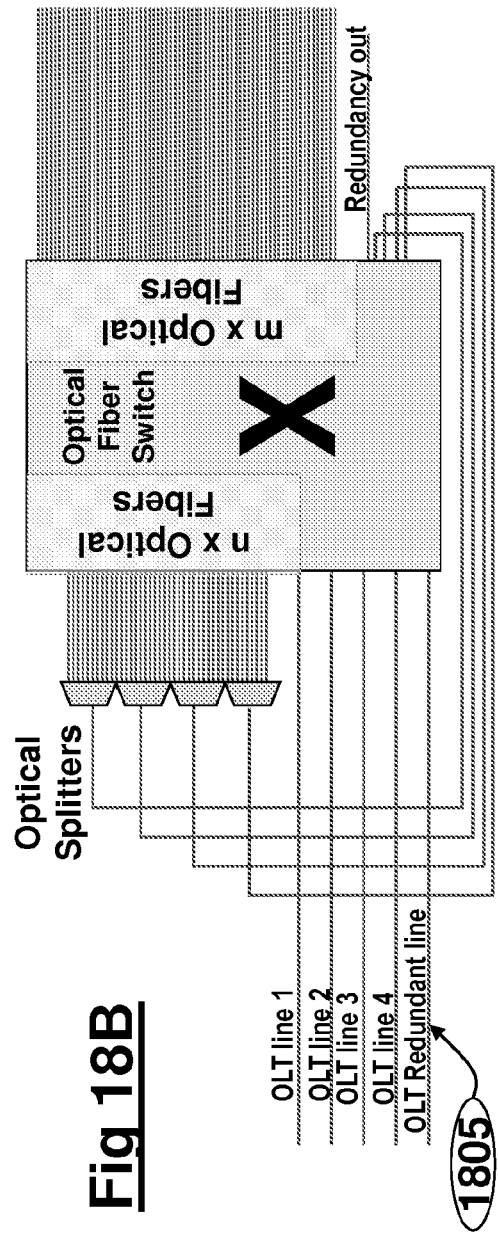
FIG. 18B shows an exemplary assembly/system for interconnecting communication bearing cables wherein one or more dedicated cables are adapted to be used as redundant feeding cables, in accordance with some embodiments of the present invention.

According to some embodiments of the present invention, the one or more dedicated cable(s) may be further adapted to be used as a redundant feeding cable(s) (FIG. 18B; 1805) and may be connected, locally and/or remotely, as to replace malfunctioning feeder cables. Furthermore, by remotely changing the connection configuration, additional/other cables may be used for testing purposes and service restoration may be achieved in cases of feeder cable failure, by remotely replacing failed feeder cable(s).

Figure 19:
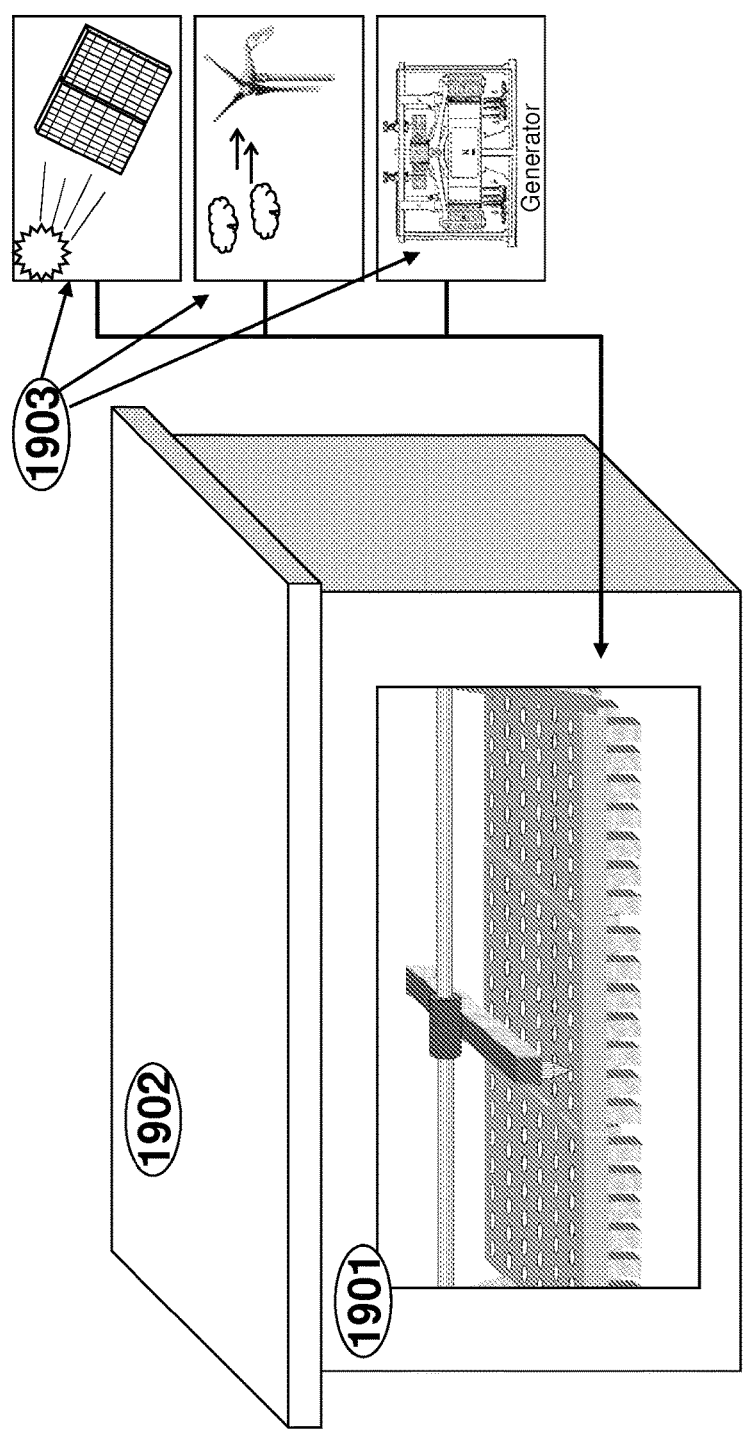
FIG. 19 shows an exemplary assembly/system for interconnecting communication bearing cables operated as part of a self energized Outside Plant (OSP), in accordance with some embodiments of the present invention.

According to some embodiments of the present invention, an assembly/system for interconnecting communication bearing cables (FIG. 19; 1901), and/or any combination of its sub-components or combination of some or all of its sub components with additional one or more components, may be operated as part of a self energized Outside Plant (OSP) such as, but in no way limited to, a Passive Optical Network (PON) (1902). Electrical power needed for the operation of the assembly/system may be produced by a substantially local electrical power generator (1903), electrically associated with the assembly/system, such as one or more solar panels, one or more wind operated turbines and/or any other method of locally producing electrical power.

Two Support Structures Embodiments

According to other embodiments of the present invention, a method, device, assembly and system for facilitating the interconnection of communication bearing cables may comprise two or more cable interconnect-point support structures. According to some embodiments, there is provided a first cable interconnect-point support structure including a set of cable interconnect-point/connectors parking slots. Each of at least some of the interconnect-point parking slots on the first cable interconnect-point support structure may support a cable interconnect-point/connector of a cable from a first set of cables. According to some embodiments of the present invention, an interconnect-point parking slot may have a first opening on a first surface of the first support structure and a second opening on a second surface of the first support structure, such that a cable interconnect-point/connector may be mobilized and its respective cable (i.e. the cable to which tip it is connected) threaded through its respective interconnect-point(s) parking slot, entering through a first opening and exiting through a second opening of the first support structure.

According to further embodiments of the present invention, there is provided a second cable interconnect-point/connector support structure including a set of fixed cable interconnect-point parking slots, wherein each of at least some of the fixed parking slots may be adapted to fixedly support an interconnection-point/connector of a cable from a second set of cables. According to some embodiments of the present invention, a first opening of a given fixed parking slot may be adapted to receive and fixedly support an interconnection-point/connector of a cable from the second set of cables, and a second opening of the given slot may be adapted to receive and support an interconnection-point/connector of a cable from the first set of cables. The first opening may be on a first surface of the second structure and the second opening may be on a second surface of the second structure, and the first and second openings may be connected and optionally aligned with each other. According to further embodiments of the present invention, slot openings may allow for the insertion/retreat of an electromechanical arm/pincer/threador that may be adapted to mobilize interconnection-points/connectors and their respective cables, and/or connect/disconnect them.

According to further embodiments of the present invention, the first and second support structures may be positioned relative to one another such that their respective second surfaces substantially face one another. According to further embodiments of the present invention, either or both of the support structures may be functionally associated with one or more electromechanical actuators (e.g. stepper motor, pneumatic actuator, piezoelectric positioning motor, etc.) adapted to move and/or optionally rotate a support structure relative to another support structure. A control-logic, such as a dedicated controller or programmed processor, may be adapted to move one support structure relative to another such that a slot opening on the first structure may be aligned with a slot opening on a second support structure.

According to some embodiments of the present invention, a first cable with a first interconnection-point/connector parked in a first parking slot of the first support structure may be mobilized through the first parking slot, entering through the first opening and exiting through the second, so as to affix the interconnection-point/connector to the second opening of a parking slot on the second support structure. According to some embodiments of the present invention, the electromechanical arm/pincer/threador may: 1. approach a first slot in the first support structure, 2. grab a portion of a cable interconnection-point/connector within the first slot, 3. pull the interconnection-point/connector, and its respective cable, through the second opening of the slot on the first support structure, 4. insert the interconnection-point/connector into a second opening of a slot on the second support structure; and 5. return to its initial position—thereby connecting the interconnection-point/connector of a cable in the first cable set with an interconnection-point/connector of a cable in the second set.

According to further embodiments of the present invention, the control logic may be functionally associated with a data structure (e.g. database table, lookup table, etc.) which includes mapping information between cable designators and slot designators. When the control logic receives a command (manually or from a fiber routing controller system) to connect a first cable (designated by a first cable designator) from the first set of cables to a second cable (designated by a second cable designator) in the second set of cables, the control logic may: 1. lookup the cables' respective slots, and 2. cause the electromechanical actuators to align a slot associated with the first cable (i.e. the slot in which the first cable is parked) on the first support structure, with a slot, associated with the second cable, on the second support structure. According to further embodiments of the present invention, the control logic may cause actuators connected to both support structures to move both support structures so as to align the respective slots with each other in a position adjacent/aligned with the mechanical arm/pincer/threador. Alternatively, the control logic may cause an actuator connected to the arm/pincer/threador to move the arm/pincer/threador so as to align itself in a position adjacent/aligned with the both support structures' respective slots. The control logic may then cause the arm/pincer/threador to thread the first cable through the first slot and to insert the first cable interconnection-point/connector into the second opening of the second slot.

According to some embodiments of the present invention, only one of the interconnection-points/connectors of a cable in the second set of cables may be parked in a slot of the second support structure—such that the cable in the second set of cables may be lead out to another device or system. According to further embodiments of the present invention, each of both interconnection-points/connectors of a cable in the second set of cable may be parked in a separate slot of the second structure, and the cable may be used as a bridging cable between two cables in the first set of cables. For example, if the control logic receives a command to connect two cables in the first set of cables, the control logic may cause each of the two cables in the first set to be connected to a different interconnection-point/connector of the same cable (e.g. connectors on both its tips) in the second set of cables. Thus, the cable in the second set of cables may act as a link between the interconnection-points/connectors of the two cables in the first set, connecting them to each other.

Figure 20B:
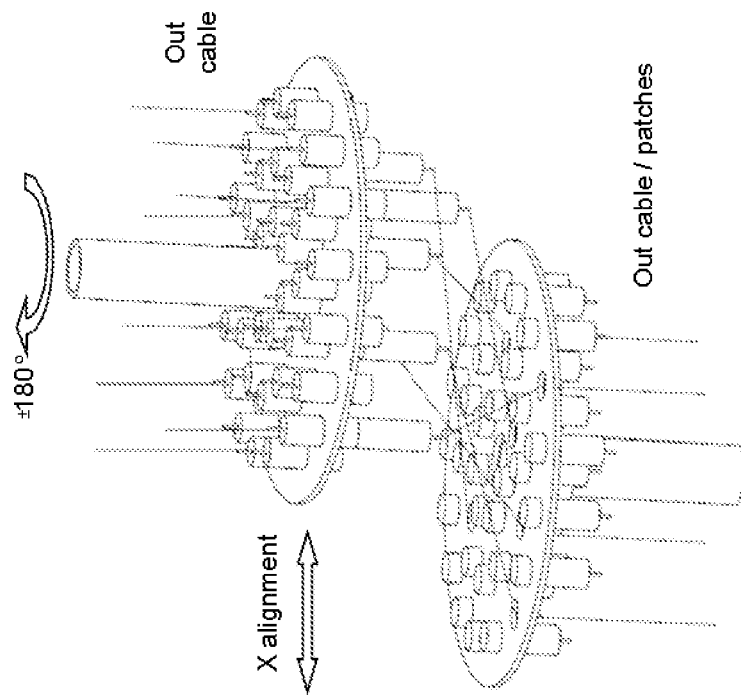
Figure 20A:
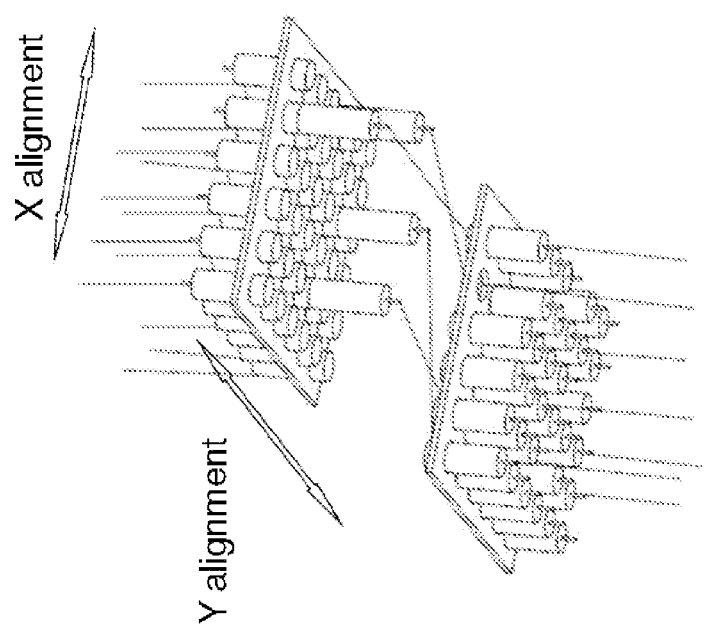

According to some embodiments of the present invention, interconnect points of the first set and the second set of cables may be arranged in a two dimensional array configuration as to provide high spatial density. Furthermore, interconnect points of the first set and the second set of cables may be arranged in various configurations, including the following exemplary configurations:

1. Two planar surfaces—wherein slot alignment may be achieved by relative parallel movement of the surfaces along their respective X and Y axles (FIG. 20A);

2. Two circular discs—wherein slot alignment may be achieved by relative radial (i.e. along the radius) movement (e.g. maximum relative movement range equals to the radius of one of the discs) and/or the angular turning of one or both discs around their axels (e.g. maximum relative movement range equals to 360 degrees, +/−180 degrees for each of the discs or +/−180 degrees any of the discs) (FIG. 20B). Angular turning of both discs, rather than merely one of them, may lower the maximal turning of each of the single discs, and may thus prevent looping and tangling of cables.

Figure 20C:
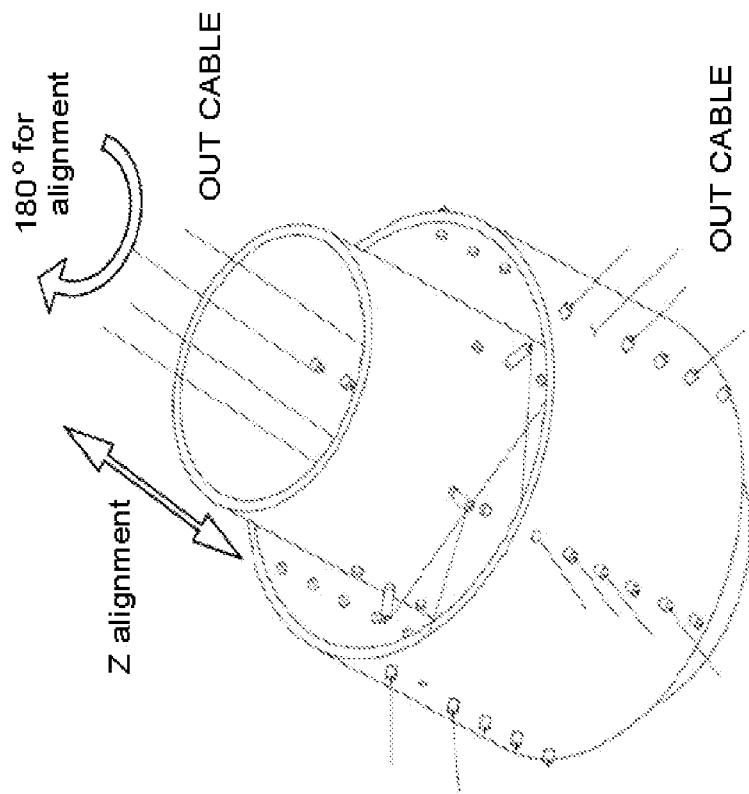

3. Two cylindrical tubes of different radiuses—wherein slot alignment may be achieved by relative up/down movement along the Z axle and/or the turning of one or both tubes around their axels (e.g. maximum relative movement range equals to 360 degrees or 180 degrees for each of the tubes) (FIG. 20C);

4. Two spherical or partially spherical surfaces.

Exemplary Schemes—Two Support Structures Embodiments

Reference is made to FIG. 21A where there is shown, in accordance with some embodiments of the present invention, an exemplary connection scheme between a cable interconnect-point/connector (2121A) of a cable from a first set of cables parked in a parking slot (X) of the first support structure (2101), and a cable interconnect-point (2111A) of a cable from a second set of cables parked in a parking slot (Y) of the second support structure (2102) may comprise some or all of the following steps:

1. Move one support structure, for example by use of the angular actuator (2123) and/or radial linear actuator (2124), relative to another such that the slot opening (X) on the first structure may be aligned with the slot opening (Y) on a second support structure.

2. Move both support structures, for example by use of the angular actuator (2113) and/or radial actuator (2114), so as to align their respective slots (X and Y) with each other in a position adjacent/aligned with the mechanical arm/pincer/threador (2112).

3. Cause the arm/pincer/threador (2112) to grip the first cable's interconnect-point, pull it and thread its respective cable through the first slot (X) and, while creating for it a cable free corridor, mobilize and insert the first cable interconnect-point into the opening of the second slot (Y), thus connecting it to the second cable's static interconnect-point (2111A). The mechanical arm/pincer/threador (2112) may be seen at an exemplary bottom-position of its range of movement (FIG. 21B).

According to further embodiments of the present invention, an exemplary disconnection scheme between a cable interconnect-point of a cable from a first set of cables, which was initially parked in a parking slot (X), of the first support structure (FIG. 21A), 2101), and a cable interconnect-point of a cable from a second set of cables parked in a parking slot (Y) of the second support structure (2102) to which the interconnect-point (2121B) of the cable from a first set of cables has been connected, may comprise some or all of the following steps:

1. Move one support structure, for example by use of the angular actuator (2123) and/or radial linear actuator (2124), relative to another such that the slot opening (X) on the first structure may be aligned with the slot opening (Y) on a second support structure.

2. Move both support structures, for example by use of the angular actuator (2113) and/or radial actuator (2114), so as to align their respective slots (X and Y) with each other in a position adjacent/aligned with the mechanical arm/pincer/threador (2112).

3. Cause the arm/pincer/threador (2112) to grip the first cable's interconnect-point (2121B), which is connected to the second cable's static interconnect-point (2111A), push it, substantially in the direction of the first support structure, disconnect it from the second cable's static interconnect-point (2111A) parked at slot (Y), and mobilize it along the path between slot (Y) and slot (X), while the shape of the bottom end of the first cable's interconnect-point (2121B) pushes away any cross fiber, thus creating for it a cable free corridor.

4. Park the first cable's interconnect-point (2121B) in slot (X) on the first structure. Slots (X) and (Y) may now be free to serve a new connection when required.

Figure 22:
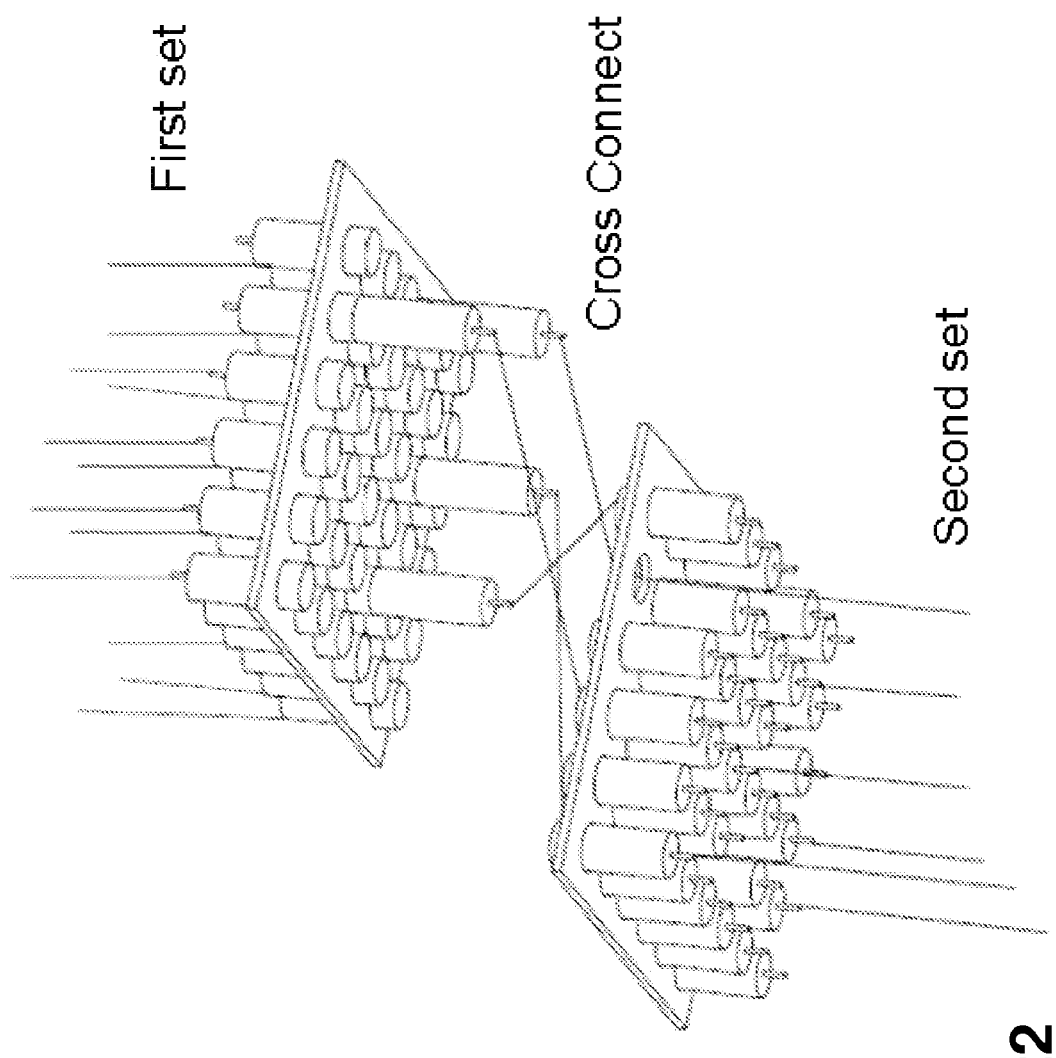
FIG. 22 schematically shows an exemplary device for interconnecting one or more cables of a first set to one or more cables of a second cable set, in accordance with some embodiments of the present invention.

According to further embodiments of the present invention, multiple (X) to (Y) connection schemes as described above may be used for the connection of any group or subgroup of cable interconnect-points/connectors of a first set of cables of a first support structure; to any corresponding group or subgroup of cable interconnect-points of a second set of cables of a second support structure (FIG. 22).

According to some embodiments of the present invention, an exemplary connection scheme between a cable interconnect-point/connector (2111A) of a cable from a first set of cables parked in a parking slot (X) of the second support structure (2102), and a second cable interconnect-point/connector of a cable from the first set of cables parked in a parking slot (Y) of the second support structure (2102) may be executed; wherein, cables of the second set of cables of the first support structure (2101) may be used as bridging/patching cables between each two cables in the first set of cables, such that: a patching cable from the second set having one of its interconnect-points, which was initially parked in slot (Xp) of the first support structure (2101) and is now parked in slot (X) of the second support structure; has its second interconnect-point, which was initially parked in slot (Yp) of the first support structure and is now parked in slot (Y) of the second support structure. This connection scheme may comprise some or all of the following steps:

1. Move one support structure, for example by use of the angular actuator (2123) and/or radial linear actuator (2124), relative to another such that the slot opening (Xp) on the first structure may be aligned with a free slot opening (X) on a second support structure.

2. Move both support structures, for example by use of the angular actuator (2113) and/or radial actuator (2114), so as to align their respective slots (X and Xp) with each other in a position adjacent/aligned with the mechanical arm/pincer/threador.

3. Cause the arm/pincer/threador (2112) to grip the bridging/patching cable's first interconnect-point, pull it and thread its respective cable through its slot (Xp) and, while creating for it a cable free corridor, mobilize and insert the cable's first interconnect-point into the opening of the second slot (X) on the second support structure, thus connecting it to a first cable's static interconnect-point (e.g. 2111A).

Figure 23B:
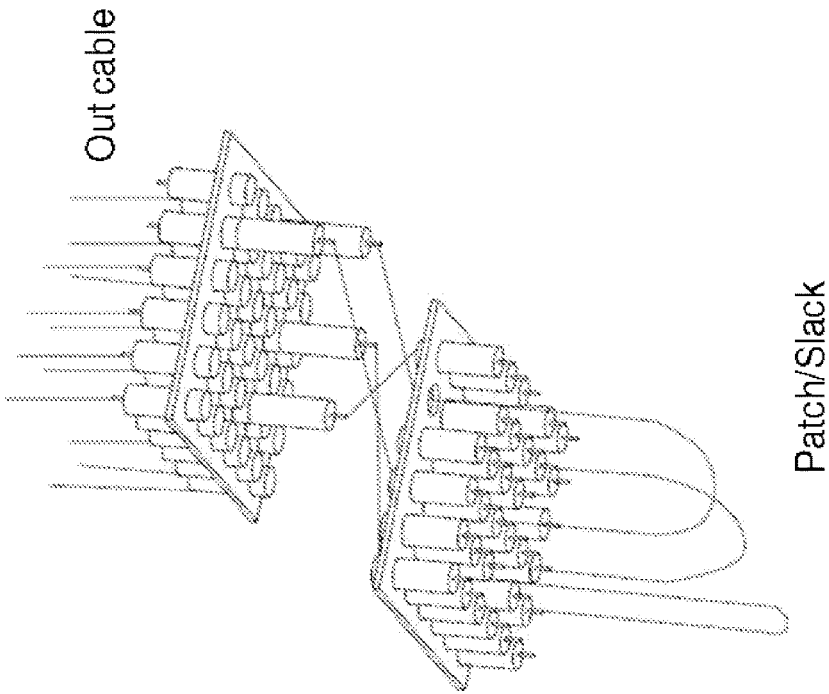
FIG. 23B schematically shows an exemplary device for interconnecting a combination of: two or more cables of a first set by use of one or more bridging/patching cables of a second cable set; and, one or more cables of a first set to one or more cables of a second cable set, in accordance with some embodiments of the present invention.
Figure 23A:
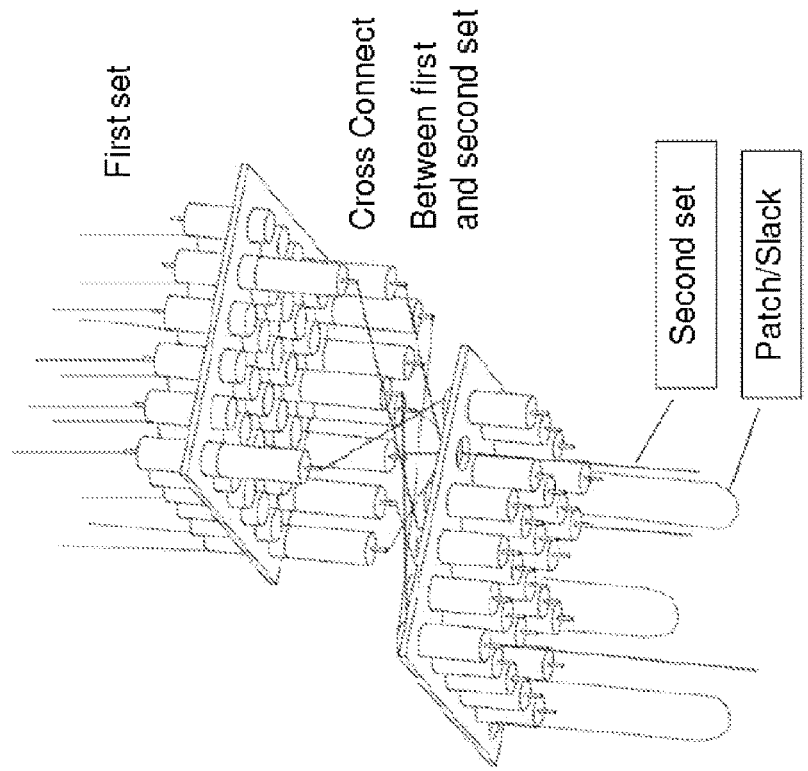
FIG. 23A schematically shows an exemplary device for interconnecting two or more cables of a first set by use of one or more bridging/patching cables of a second cable set, in accordance with some embodiments of the present invention.

Steps 1-3 may then be repeated for cable interconnect-points parked at slots (Yp) and (Y) respectively, wherein (Yp) denotes the initial parking slot of the interconnect-point of the second end of a bridging/patching cable of the first structure, which bridging/patching cable's first end interconnect-point is already parked in slot (X). Upon completion of said steps interconnect-point initially parked at slot (X) may be connected to interconnect-point/connector originally parked at slot (Y) through bridging/patching cable (Xp-Yp) (FIG. 23).

Figure 24:
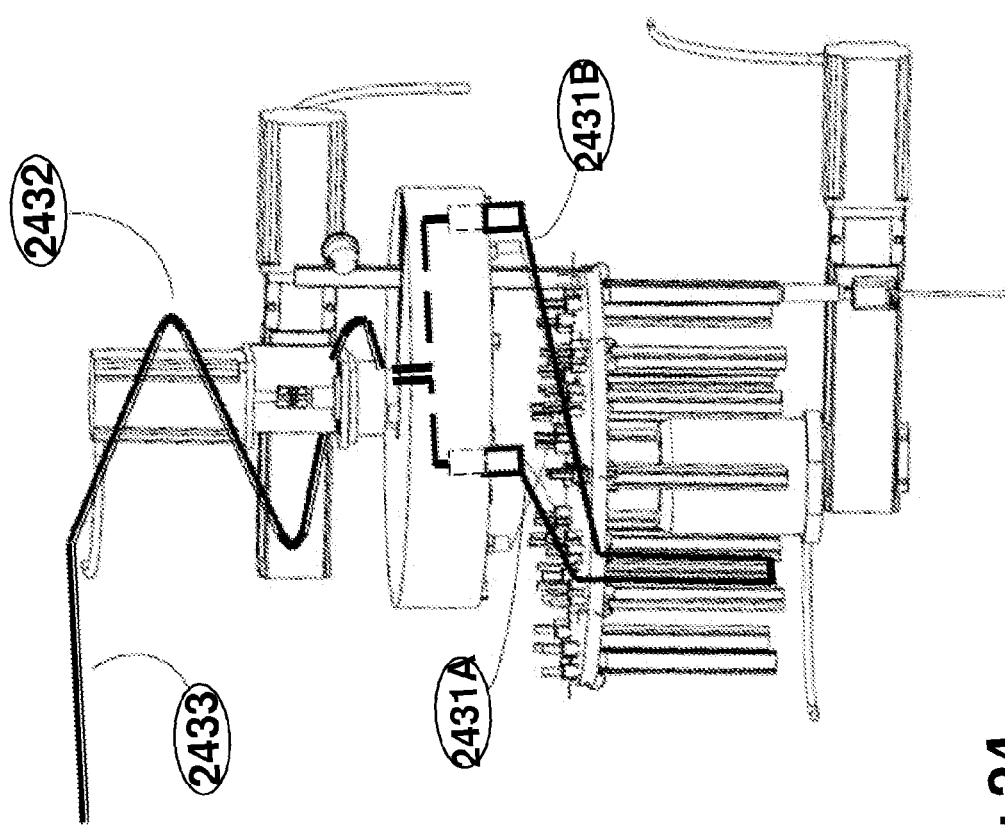
FIG. 24 schematically shows a possible inter-connected, patched-cable and patch-connected cables path, in accordance with some embodiments of the present invention.

Reference is now made to FIG. 24 where there is shown, in accordance with some embodiments of the present invention, an exemplary path of cables of a scheme for interconnecting two or more cables of a first set by use of one or more bridging/patching cables of a second cable set. Cable interconnection-point/connector (2431A) and Cable interconnection-point/connector (2431B) represent two interconnection-points of a single bridging/patching cable. A spiral slack loop (2432) may allow for the circular support structure's rotation. Further path of patched cables to/from the interconnecting device is also shown (2433).

According to further embodiments of the present invention, an exemplary disconnection scheme between a cable interconnect-point/connector of a cable from a first set of cables parked in a parking slot (X) of the second support structure (2102), and a second cable interconnect-point/connector of a cable from the first set of cables parked in a parking slot (Y) of the second support structure (2102); and wherein cables of a second set of cables of the first support structure (2101) may be used as bridging/patching cables between each two cables in the first set of cables, such that: a patching cable from the second set having one of its interconnect-points, which was initially parked in slot (Xp) of the first support structure (2101) and is now parked in slot (X) of the second support structure; has its second interconnect-point, which was initially parked in slot (Yp) of the first support structure and is now parked in slot (Y) of the second support structure.

1. Move one support structure, for example by use of the angular actuator (2123) and/or radial linear actuator (2124), relative to another such that the free slot opening (Xp) on the first structure may be aligned with the slot opening (X) on a second support structure.

2. Move both support structures, for example by use of the angular actuator (2113) and/or radial actuator (2114), so as to align their respective slots (X and Xp) with each other in a position adjacent/aligned with the mechanical arm/pincer/threador.

3. Cause the arm/pincer/threador (2112) to grip the bridging/patching cable's first interconnect-point (e.g. 2121B), which is connected to the first cable's static interconnect-point (2111A), push it, substantially in the direction of the first support structure, disconnect it from the first cable's static interconnect-point (2111A) parked at slot (X), and mobilize it along the path between slot (X) and slot (Xp—its pre-connection parking slot), while the shape of the bottom end of the bridging/patching cable's first interconnect-point (2121B) pushes away any cross fiber, thus creating for it a cable free corridor.

4. Park the bridging/patching cable's first interconnect-point (2121B) in slot (Xp) on the first support structure (2101).

Steps 1-4 may then be repeated for the bridging/patching cable's second interconnect-point/connector, connected to a second cable's interconnect-point/connector, and which are connectively parked in a parking slot (Y) of the second support structure. Upon completion of said steps bridging/patching cable (Xp-Yp) may be free to bridge a new connection between any two cables' interconnect-points from the first set of cables.

According to some embodiments of the present invention, certain embodiments may be adapted to utilize a combination of: the above mentioned connection scheme between a cable interconnect-point/connector of a cable from a first set of cables parked in a parking slot (X) of the first support structure (2101), and a cable interconnect-point/connector of a cable from a second set of cables parked in a parking slot (Y) of the second support structure (2102); and, a connection scheme between a cable interconnect-point/connector of a cable from a first set of cables parked in a parking slot (X') of the first support structure (2101), and a second cable interconnect-point/connector of a cable from the first set of cables parked in a parking slot (Y') of the first support structure (2101). Such a configuration may include two or more bridging/patching cable interconnect-point/connector slots and two or more non-bridging cable interconnect-point/connector slots, on each of the support structures (FIG. 23).

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. An optical switch for facilitating the interconnection of communication bearing fiber cables, said switch comprising:
   a. one or more interconnect-point support structures comprising four or more parking spots, wherein at least one of the four or more parking spots is adapted to host a respective moveable cable connector attached to a respective communication fiber cable, and wherein said moveable cable connector is configured such that exerting a pulling force on the respective fiber cable of said moveable cable connector mobilizes said moveable cable connector towards a respective parking slot for said moveable cable connector;
   b. a mechanical actuator system having at least one arm configured to create a free-of-cable corridor by pushing aside a fiber cable segment, and said mechanical actuator system further configured to functionally operate on a moveable cable connector accessible via the free-of-cable corridor;
   c. a slack management mechanism per each moveable connector cable for adjusting cable slack during mobilization of a respective said moveable cable connector wherein
   new connection of a pair of said respective communication bearing fiber cables is made by operating said mechanical actuator system to grip a first moveable connector, to mobilize the first moveable connector, and to mate the first moveable connector with a second connector, wherein the cable segment between said respective parking spots has a substantially self suspended straightforward unrestricted path.

2. The optical switch according to claim 1, wherein said mechanical actuator system is further adapted to:
   (a) grip and disconnect a given moveable connector from another connector to which the given moveable connector is connected,
   (b) release gripping of said given connector, and,
   (c) exert a pulling force to a given fiber cable connected to the given connector so as to mobilize the given connector towards a respective parking spot for the given connector.

3. The optical switch according to claim 1, wherein a said interconnect-point support structure surface is a shape selected from the group consisting of: substantially planar, substantially cylindrical and substantially non planar.

4. The optical switch according to claim 1, wherein said interconnect-point support structure has a flexible surface layer to facilitate local deformation of said flexible layer when a moving connector encounters an obstacle during moving.

5. The optical switch according to claim 1, wherein said parking spots are arranged on said interconnect-point support structure surface in a two dimensional array.

6. The optical switch according to claim 1, wherein said fiber cable is selected from the group of fiber types consisting of: multimode fiber, single mode fiber, dual or multiple fibers, combined one or more fibers with one or more electrical wires, or bundled fibers with strengthening wire.

7. The optical switch according to claim 1, wherein a fiber cable connector comprise a removable adaptor to facilitate connection between pairs of connectors.

8. The optical switch according to claim 1, wherein said slack management mechanism has at least one displaceable pulley, displaced in response to an applied force, which applied force is then transferred to the respective fiber cable to provide said pulling force along a dragging path.

9. The optical switch according to claim 8, wherein the said at least one displaceable pulley incorporates a locking mechanism to disable pulley displacement while locked.

10. The optical switch according to claim 1, wherein said slack management mechanism comprises at least one pulley adapted to handle more than one fiber cable route to facilitate increased fiber cable surplus range per a given displacement range.

11. The optical switch according to claim 1, wherein said at least one mechanical arm is of a substantially nib tip shape and is substantially hollow.

12. The optical switch according to claim 11, wherein at least one said mechanical arm has a groove along at least a portion of the length of the mechanical arm, the groove for guiding aside the fiber cable of a gripped connector.

13. The optical switch according to claim 1, wherein said at least one mechanical arm is further adapted to transfer force to a said slack management mechanism for dragging the respective moveable connector.

14. The optical switch according to claim 1, wherein said at least one mechanical arm is further adapted to vibrate.

15. The optical switch according to claim 1, wherein said at least one mechanical arm includes one or more of the mechanisms consisting of:
   a connector gripping mechanism, an adaptor gripping mechanism, a disconnect mechanism, a connector mating mechanism, an adaptor removing mechanism and an adaptor mounting mechanism.

16. The optical switch according to claim 1, wherein said moveable connector includes a substantially conically shaped portion with a tip from an attached fiber cable emerges.

17. The optical switch according to claim 16, wherein said conical shape is characterized by a tapering body with a sharp-cut tip.

18. An optical switch according to claim 17, wherein said moveable connector is a standard, commercially available connector housed in a said conical shape jacket.

19. The optical switch according to claim 1, wherein one or more fiber cable connectors further comprise a latching mechanism adapted to passively retain a connection.

20. The optical switch according to claim 1, wherein said mechanical actuator system is further adapted to release a cable connector from a connector parking spot and mobilize the released connector.

21. The optical switch according to claim 1, wherein a first fiber cable connector is parked within a cable connector parking spot in a first interconnect-point support structure, and a second fiber cable connector is parked within a cable connector parking spot in a second interconnect-point support structure that is structurally associated with said first interconnect-point support structure.

22. The optical switch according to claim 21, wherein additional one or more interconnect-point support structures may be structurally associated with the first interconnect-point support structure, without affecting previously made connections.

23. The optical switch according to claim 21, further adapted to align a first cable connector parking spot of a first interconnect-point support structure with a second cable connector parking spot of a second interconnect-point support structure prior to a connect or disconnect operation sequence.

24. The optical switch according to claim 1, further comprising one or more optical splitters, wherein terminals of one or more said splitters are connected by said communication bearing fiber cables to facilitate rerouting of said splitter terminals.

25. The optical switch according to claim 1, wherein said mechanical actuator is further configured to be manually held.

26. A method for facilitating interconnection of communication bearing cables, each of which cables is connected to a cable connector, said method comprising:
mobilizing a mechanical arm, such that the arm mechanically pushes away one or more previously connected communication bearing cables, which cross a mobilization path of the arm, thus clearing access towards a cable connector parked in a parking spot of an interconnect-point support structure.

27. An optical switch for facilitating the interconnection of communication bearing fiber cables, wherein said cables are connected to a cable connector, said switch comprising:
one or more interconnect-point support structures comprising four or more cable connector parking spots, wherein at least one of said parking spots is adapted to host the cable connector with a housing configured to eject out of the parking spot, and
during ejection, the housing clearing away a course for the ejection, by pushing aside any of previously interconnected crossing communication bearing fiber cables, thus bringing said connector to a freely accessible space.

* * * * *